(12) United States Patent
Bar-Or

(10) Patent No.: US 6,615,162 B2
(45) Date of Patent: Sep. 2, 2003

(54) NOISE REDUCING/RESOLUTION ENHANCING SIGNAL PROCESSING METHOD AND SYSTEM

(75) Inventor: Raphael Bar-Or, Denver, CO (US)

(73) Assignee: DMI BioSciences, Inc., Englewood, CO (US)

(*) Notice: Subject to any disclaimer, the term of this patent is extended or adjusted under 35 U.S.C. 154(b) by 408 days.

(21) Appl. No.: 09/732,474

(22) Filed: Dec. 6, 2000

(65) Prior Publication Data

US 2003/0050767 A1 Mar. 13, 2003

Related U.S. Application Data

(60) Provisional application No. 60/169,178, filed on Dec. 6, 1999.

(51) Int. Cl.[7] .............................................. G11B 27/36
(52) U.S. Cl. ........................... 702/191; 702/66; 702/67; 702/69; 702/70; 702/75; 702/76
(58) Field of Search ..................... 702/66, 67, 69, 702/70, 71, 74, 75, 76, 77, FOR 107–FOR 110, FOR 117, FOR 124, FOR 134–FOR 135, FOR 137, FOR 156, FOR 164, FOR 166, FOR 168; 250/281, 282, 286, 288, 290, 291, 292, 293; 324/76.11, 76.12, 76.13, 76.14, 76.15, 76.18, 76.19, 76.21, 76.24, 76.41, 76.42, 76.44, 76.45, 76.46, 76.47

(56) References Cited

U.S. PATENT DOCUMENTS

| | | | | |
|---|---|---|---|---|
| 4,736,101 A | * | 4/1988 | Syka et al. ............... | 250/292 |
| 4,761,545 A | * | 8/1988 | Marshall et al. .......... | 250/291 |
| 5,015,848 A | * | 5/1991 | Bomse et al. ............ | 250/281 |
| 5,134,286 A | * | 7/1992 | Kelley ...................... | 250/282 |
| 5,387,930 A | | 2/1995 | Toh .......................... | 348/207 |
| 5,491,551 A | * | 2/1996 | Mattson .................... | 356/451 |
| 5,703,358 A | * | 12/1997 | Hoekman et al. ......... | 250/282 |
| 5,790,710 A | | 8/1998 | Price et al. ............... | 382/255 |
| 5,815,580 A | | 9/1998 | Craven et al. ............ | 381/58 |
| 5,822,718 A | | 10/1998 | Bakis et al. ............... | 702/180 |
| 5,862,269 A | | 1/1999 | Cohen et al. ............. | 382/304 |
| 6,028,543 A | * | 2/2000 | Gedcke et al. ........... | 341/131 |
| 6,130,958 A | | 10/2000 | Rohler et al. ............. | 382/131 |
| 6,256,157 B1 | * | 7/2001 | Biskeborn et al. ........ | 360/31 |
| 6,263,290 B1 | * | 7/2001 | Williams et al. .......... | 702/71 |
| 6,449,570 B1 | * | 9/2002 | Wilstrup et al. .......... | 702/69 |
| 6,449,584 B1 | * | 9/2002 | Bertrand et al. .......... | 702/180 |
| 6,529,842 B1 | * | 3/2003 | Williams et al. .......... | 702/66 |

* cited by examiner

Primary Examiner—Marc S. Hoff
Assistant Examiner—Carol S. Tsai
(74) Attorney, Agent, or Firm—Sheridan Ross P.C.

(57) ABSTRACT

A noise reduction/resolution enhancement signal processing method and system is disclosed, wherein the influence of noise spikes and gaps is substantially reduced. The data for the noise reduction may be amplitudes ($b_x$) measured at corresponding values (x) over a given domain D, wherein the data defines a composite wave form. The composite wave form is decomposed into instances of a discrete wave form, each having reduced noise amplitudes. A candidate point c in D for, e.g., an amplitude extreme is determined for each discrete wave form instance (having unknown amplitude). A minimization technique determines a first set of discrete wave form instances (having known amplitudes) by collapsing on the amplitudes ($b_x$) from above. A maximization technique determines a second set of discrete wave form instances (having known amplitudes) by rising up to the amplitudes ($b_x$) from below. For each point c, a determination is made as which of the corresponding instances from the first and second sets results in a better reduction in noise, and this determination is used to provide a resulting discrete wave form instance at c. Embodiments of the invention are disclosed for mass and light spectrometry, digital imaging and audio applications.

24 Claims, 15 Drawing Sheets

FIG. 20B

2024
For each $CTS_i$, for each $x_j$ in $CTS_i$, $M_{1i} \leq j \leq M_{2i}$, provide an expression $h_{ij}(c_i)$, wherein $h_{ij}(c_i)$ corresponds to an intensity/amplitude of $I_i$ at $x_j$, wherein $c_i$ is the unknown intensity of $I_i$ at $x_i$ (e.g., determine $h_{ij}(c_i)$ by a linear programming technique).

2028
Let $AC$ = the vector $\left[ \sum_{j=i_0}^{k} h_{ij}(c_i), \right]$ $i_0 \leq i, j \leq k$ where $h_{ij}(c_i)=0$ for such terms not otherwise defined in the previous step. Maximize the objective function $$\sum_{i=i_0}^{k} c_i \text{ subject to } AC \leq B,$$

thereby obtaining the vector $C_{MAX}=[c_{(MAX, i)}]$, wherein $c_{(MAX, i)}$ is an approximation of the intensity at $x_i$ of $I_i$.

2032
Minimize the objective function $$\sum_{i=i_0}^{k} c_i \text{ where } i_0 \leq i \leq k, \text{ subject to } AC \geq B,$$

thereby obtaining the vector $C_{MIN}=[c_{(MIN, i)}]$, wherein $C_{(MIN, i)}$ is an approximation of the intensity at $x_i$ of $I_i$.

For each $x_i$ in CNTR, (i) replace $b_i$ with $(c_{(MAX,i)} - c_{(MIN,i)})/2$ or some other intermediate value;

(ii) recompute both $c_{(MAX,i)}$ and $c_{(MIN,i)}$ using the new value of $b_i$ thereby obtaining $nc_{(MAX,i)}$ and $nc_{(MIN,i)}$;

(iii) determine how much each of the $nc_{(MAX,i)}$ and $nc_{(MIN,i)}$ changed from $c_{(MAX,i)}$ and $c_{(MIN,i)}$ respectively;

(iv) determine a new amplitude $nc_i$ of $I_i$ wherein $nc_i$ is more dependent on the one of $c_{(MAX,i)}$ and $c_{(MIN,i)}$ whose corresponding new value $nc_{(MAX,i)}$ and $nc_{(MIN,i)}$ changed the least.

2040

For each $I_i$, output data indicative of its center and its corresponding intensity/amplitude for identifying a physical characteristic of the item from which the composite wave form was obtained.

END

NOISE REDUCING/RESOLUTION ENHANCING SIGNAL PROCESSING METHOD AND SYSTEM

RELATED APPLICATIONS

The present application claims the benefit of the U.S. Provision Patent Application Ser. No. 60/169,178 filed Dec. 6, 1999.

RELATED FIELD OF THE INVENTION

The present invention is related to a signal processing method and system for reducing noise and enhancing resolution of signal data obtained from; e.g., spectrometer, a digital camera, or a digital sound recorder.

BACKGROUND

Mass Spectrometry is an analytical technique used to identify compounds based on their molecular weights. There are several basic types of mass spectrometers, all of which rely on similar basic principles. In mass spectrometry, samples are ionized at a source and are selectively accelerated using strong electromagnetic fields to a detector. The result is a discrete frequency distribution of mass to charge ratios detected by the mass spectrometer as a relative (i.e., detector dependent) detector impact intensity. The output is a spectrum of intensity peaks as shown in FIG. 1.

One of the problems that often arise in mass spectrometry (and many other signal processing applications) is the difficulty in distinguishing a real signal from noise produced when obtaining such intensities. Furthermore, any given mass spectrometer has a limited sampling resolution thus causing a single ionized mass to be displayed as a Gaussian distribution rather than a single discrete point. The limited resolution coupled with the noise problem often makes it difficult to identify and separate non-noise signals that are weak and/or so close in proximity to other non-noise signals such that it is difficult to accurately quantify the intensity of peaks that can be used for identifying the compounds. In particular, quantification of weak, noisy and close peaks is very difficult. More generally, low resolution signal data often occurs as a result of hardware limitations. Accordingly, an algorithm that would effectively increase resolution would be very desirable as it is far less costly than improving the hardware.

Accordingly, it would be advantageous to have a signal processing technique that could enhance the discrimination of such non-noise peaks.

SUMMARY

The present invention is a method and system for performing a signal processing technique that enhances the discrimination of non-noise wave forms in measurements of a plurality of inputs obtained from a process. In particular, the present invention decomposes or deconvolves a wave form (denoted herein as a composite wave form) obtained from the plurality of inputs into predetermined non-composite wave forms (denoted herein as discrete wave forms, or peaks). More particularly, the present invention can be used to decompose such composite wave forms in signal processing technologies such as mass spectrometry, or any other composite wave form outputting process/application wherein:

(a) the inputs are discrete over a known domain;
(b) the peaks may only occur at predetermined discrete value over the domain;
(c) for each peak of the corresponding measurements for the inputs, there is an expected wave form for which the peak is a maximal value;
(d) the resolution is known by which measurements or readings for inputs to the wave form outputting process/application can be distinguished, i.e., resolution is the finest or smallest discrimination that is available for in measurements or readings from the wave form outputting process/application.

In one embodiment, the present invention can be used for processing mass spectra using linear programming, wherein:

(i) the expected discrete wave forms are Gaussian,
(ii) the predetermined resolution is that of the mass spectrometer being used to obtain intensities for inputs of mass to charge ratios; i.e., the predetermined resolution is the smallest difference in the m/z ratio (more generally, the input values used by the wave form outputting process/application) that the mass spectrometer (more generally, the wave form outputting process/application) can distinguish differences in readings of intensity/amplitude., and
(iii) the resulting peaks can only occur at the discrete points along the mass to charge ratio domain corresponding to atomic mass units. Accordingly, a result from the present invention is a deconvolved spectrum of charge ratios with accurate relative abundances of compounds as one skilled in the art will understand.

When an embodiment of the present invention utilizes linear programming to "fit" a sum of Gaussian (discrete wave form) functions to a given (composite wave form) spectrum where each of the discrete wave form functions is approximately centered on some multiple 1 through k of a predetermined value V, then the sum of the composite wave form is given below:

$$f(x) = \sum_{n=2}^{k} c_n e^{\frac{-(x-n)^2}{a^2}} \quad (1.1)$$

where x is an independent parameter of mass to charge ratios, k is the largest possible center for a discrete wave in the region, $c_n$ is the height (or equivalently, intensity or amplitude) of the $n^{th}$ discrete wave form, and a is proportional to the discrete wave form width, and where each discrete wave form is of the form:

$$g(x) = e^{\frac{-x^2}{a^2}} \quad (1.2)$$

where a is proportional to the width of the distribution.

In particular, for a given composite wave form to be decomposed, the present invention performs the following steps:

a) Minimizes the vector $\bar{c}=[c_1, c_2, c_3, \ldots, c_k]$ subject to each of the $f(x_i) \geq b_i$, where $b_i$ is the intensity or height of the given spectrum at $x_i$.

b) Maximizes the vector $\bar{c}$ subject to each of the $f(x_i) \leq b_i$, where $b_i$ is the intensity or height of the given spectrum at $x_i$.

Note that for mass spectrometry, atomic masses are generally quite close to integral values of one another (i.e., 1 for hydrogen, 2 for helium, etc.). Moreover, it is generally possible to determine the largest ionization charge that can be obtained for a mass spectrometer according to the ionization energy that the mass spectrometer applies to a substance being assayed. In particular, ion charges are typically between +1 and +10. Accordingly, if ions having charges between +1 and +10 are potentially generated, then the predetermined value V mentioned above may be, e.g., a mass-to-charge ratio such as $1/(2*3*5*7)=1/210$ of an atomic mass. Note that to simplify the description herein (and without loss of generally), it can be assumed that that the predetermined value V is one, and accordingly the centers of the discrete wave forms are integer values.

To provide additional background material for understanding the present invention, the following references are fully incorporated herein by reference:

1. http://www.asms.org/—The American Society for Mass Spectrometry homepage;
2. Nash, Stephen G., Sofer Ariela, *Linear and Nonlinear Programming*. McGraw-Hill 1996;
3. Stephen Wolfram *The Mathematica® Book Fourth Edition* Wolfram Research 1998; and
4. *Applications Guide*, Micromass, 1998.

Other features and benefits of the present invention will become evident from the accompanying figures and Detailed Description.

BRIEF DESCRIPTION OF THE DRAWINGS

FIGS. 20A through 20C is a flowchart showing the high level steps performed by the present invention when determining the amplitudes and centers of a plurality of discrete wave forms into which a composite wave form is decomposed.

DETAILED DESCRIPTION

Figure 1:
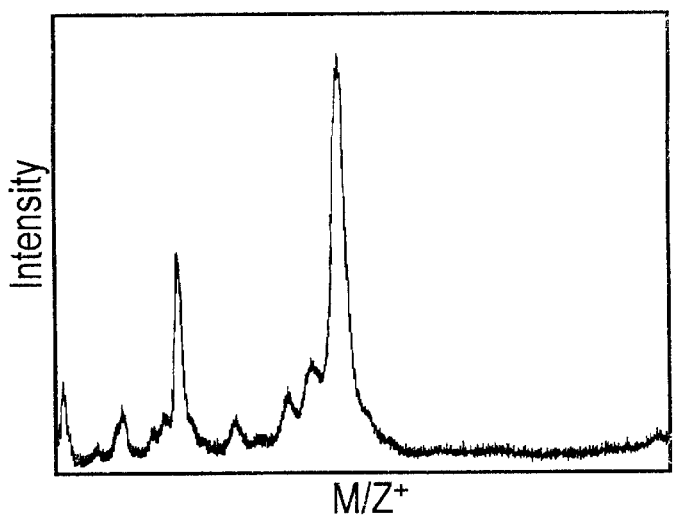
FIG. 1 shows a graph of a discrete frequency distribution of mass to charge ratios detected by the mass spectrometer as a relative (i.e., detector dependent) detector impact intensity. The output shows a spectrum of intensity peaks.

A first embodiment of the present invention for performing mass spectrometry data analysis will be described. Accordingly, the input to this embodiment is a spectrum from either a simulation of a mass spectrum, or from a mass spectrometer. The input may be in the form of a list of pairs, with each pair containing an intensity value and its corresponding mass to charge ratio. Substantially all mass spectrometers sample at a rate much higher than integer masses. Thus, the input will have many samples for each mass unit typically at equal intervals over some predetermined range such as 20 to 200. This input can be written as a matrix in the following form:

$$\begin{bmatrix} \text{Intensity}_1 & \ldots & \text{Intensity}_n \\ M/Z_1^+ & \ldots & M/Z_n^+ \end{bmatrix}$$

The first row of this matrix will be referred to as the $\bar{b}=[b_1, b_2, \ldots, b_n]$ vector.

At a high level, the first embodiment can be summarized as a method and system for performing at least one of the following operations for determining the peak amplitudes $c_i$:

$$\text{Minimize } \sigma(\bar{c}) = \sum_{i=2}^{k} c_i \quad (2.1)$$

Subject to the constraint: $f(\bar{x}) \geq \bar{b}$ and/or $$\text{Maximize } \sigma(\bar{c}) = \sum_{i=2}^{k} c_i \quad (2.2)$$

Subject to the constraint: $f(\bar{x}) \leq \bar{b}$ where f(x) is given in (1.1) above in the Summary Section. More generally, the minimization and maximization operations may be performed on substantially any functional σ (i.e., that maps vectors to a real and/or complex number) that monotonically increases with increasing values of each $c_i$ in the range of likely intensity/amplitude values (e.g., at the range including the $b_i$'s), and correspondingly also monotonically decreases with decreasing values of each $c_i$ in the range of likely intensity/amplitude values (e.g., at the range including the $b_i$'s). Accordingly, note that the function f(x) as defined in (1.1) may be used for σ. Moreover, note that many approximations to f(x) as defined in (1.1) may be used for σ. In particular, linear approximations to f(x) as defined in (1.1), wherein such linear approximations can be used in linear programming can also be used for σ. In fact, $$\sigma(\bar{c}) = \sum_{i=2}^{k} w_i * c_i$$

where $w_i$ are positive is linear approximation of f(x) as defined in (1.1), as one skilled in the art will understand, and minimizing (maximizing)

$$\sigma(\bar{c}) = \sum_{i=2}^{k} c_i$$

yields the same result as minimizing (maximizing)

$$\sigma(\bar{c}) = \sum_{i=2}^{k} w_i * c_i.$$

Note that (2.1) and (2.2) are quite different, each with its own advantage. The minimization problem produces an upper bound on the spectrum intensities, while the maximization produces a lower bound on the spectrum intensities.

Regarding noise in mass spectrometry data input to the first embodiment, there may be a fundamental distinctions in the results from each of the operations (2.1) and (2.2). However prior to describing such distinctions, it is important to identify several different types of noise, and how such noise comes about.

One type of noise, is a called a noise spike. A noise spike is a positive, sharp rise in the spectral signal intensity caused by an anomaly, which causes a substantially falsely high reading at one measurement (e.g., if a measurement $x_i$ has a falsely high $b_i$, then it is presumed that within a neighborhood {x such that $(x_i-\delta)<=x<=(x_i-\delta)$ for δ>the sampling frequency} each $b_j$ corresponding to such an x (other than $x_i$) in the neighborhood is substantially a correct intensity reading and not falsely high). For example, a spike may be defined to be a reading that is at least 1.5 times greater than what the corresponding correct reading would be. Spikes may be produced in a mass spectrometer due to, e.g., small electrical surges, black body radiation, poor vacuum, etc.

A second, more rare type of noise is called a noise gap. A noise gap is a negative, sharp decline in the spectral signal intensity caused by an anomaly. More specifically, a noise gap (also denoted simply gap herein) is a falsely low reading at one measurement (e.g., if a measurement $x_i$ has a falsely low $b_i$, then it is presumed that within a neighborhood {x such that $(x_i-\delta)<=x<=(x_i-\delta)$ for δ>the sampling frequency} each $b_j$ corresponding to such an x (other than $x_i$) in the neighborhood is substantially a correct intensity reading and not falsely low). For example, a gap may be defined to be a reading that is at least 1.5 times lower than what the corresponding correct reading would be. Generally in mass spectrometry this type of noise occurs less often since most generated spectral data are in fact many spectra averaged together to reduce the signal to noise ratio. Since averaging is an additive process any noise gap in one spectrum is usually filled by averaging with others (all spectra have only non-negative intensities). This is not true of noise spikes; in fact, in the extreme case, noise spikes may accumulate with averaging.

Moreover, it is important to note that spike and gap types of noise are not limited to spectral signal data. Such noise types may occur in various signal processing applications such as mass or light spectrometry for: (a) absorption/transmission analysis for measuring a concentration, and/or composition and/or atomic configuration of substances or mixtures, (b) fluorescence, (c) Raman, (d) natural magnetic resonance (NMR). Additionally, the signal processing method of the present invention may also be used for enhancing a digital image or any image where the image is composed of discrete samples and the underlying distribution is known.

As shown in the graph 204 (FIG. 2) of f(x), the corresponding to the $c_i$'s determined by the minimization operation of (2.1) may result in f(x) not closely fitting the intensities in a neighborhood of a noise spike (e.g., spike 208), wherein the term "closely fitting the intensities in a neighborhood" is understood to mean, e.g., that for each $b_j$ in the neighborhood, the absolute value of the deviation between $f(x_j)$ and $b_j$ is less than a predetermined percentage (e.g., 5%) of the intensity of $b_j$. In particular, the minimization operation constrains $f(x_i)$ to be at least as great as $b_i$ and accordingly such a spiked measurement 208 will not allow f(x) to closely fit to adjacent intensity measurements. Thus, a falsely high result for the amplitudes $c_i$ is obtained. However, the minimization operation (2.1) can be ideal for noise gap problems (e.g., gap 212, FIG. 2), since adjacent measurements restrict the minimization from going into the gapped region (assuming, e.g., an appropriate condition such as the gap was narrower than the resolution.

Figure 2:
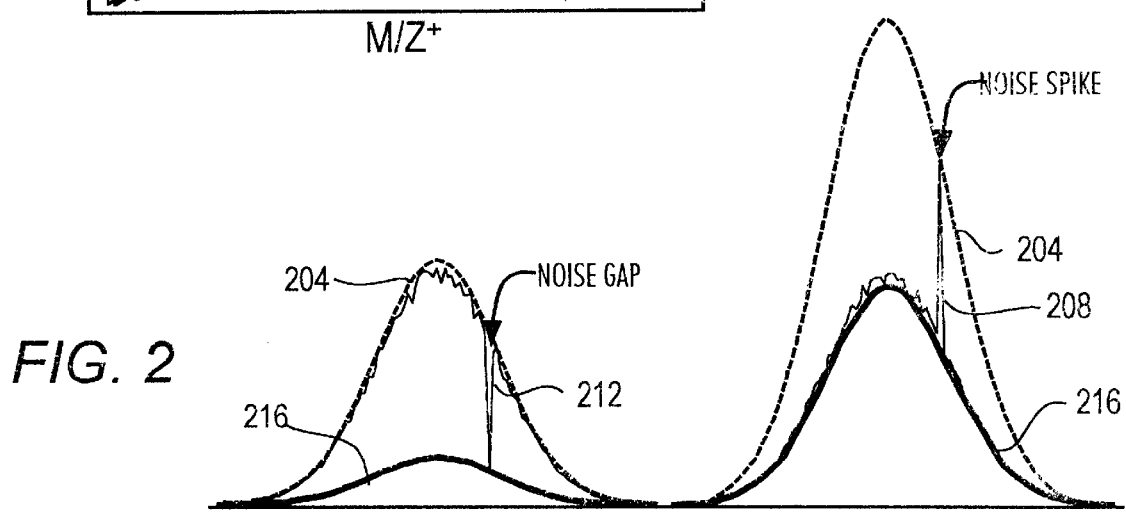
FIG. 2 shows a graph of the minimization operation (2.1) (graph 204) and maximization operation (2.2) (graph 216) together with a representation of a composite wave form having both a noise spike 208 and a gap 212.

In contrast to the minimization operation (2.1), the f(x) and the corresponding to the $c_i$'s determined by the maximization operation (2.2) may not be susceptible to spikes 208, but may fail to closely fit the intensity measurements in a neighborhood of a gap (e.g., gap 212). For example, the graph 216 of f(x) obtained from the minimization operation (2.1) closely fits the intensity readings $b_i$ in a neighborhood of the spike 208 since readings adjacent to the spike constrain the maximization from entering the spiked region. However, a gap (e.g., gap 212) may constrain the maximization from closely fitting the intensities in a neighborhood of the gap as shown in FIG. 2.

The minimization and maximization operations (2.1) and (2.2) may be performed using linear programming techniques. Accordingly, to linearize the constraints of (2.1) and (2.2), the ratio of measurements adjacent to the "center" of each peak can be calculated for a given resolution using the equation for g(x) above at (1.2) where $$a = \frac{\text{resolution}}{2\sqrt{\ln 2}}$$

and where the resolution is quantified as the width of the distribution at half height since the width of the distribution at half height is independent of the peak height as one skilled in the art will understand. Note that the term "center" as used herein denotes a point/region corresponding to an output measurement/reading of the wave form outputting process/application wherein the point/region has a predetermined characteristic such as being a local extreme value, having changes in the second derivative between positive and negative, and/or zero first derivative, or the point at which the integral reaches an extremum (often this is done since integrating smoothes derivatives of noisy data that are difficult to interpret.

Note that the objective function is simply the sum of the coefficients c; in the equation for f(x) above, wherein each of the $c_i$'s represent the value of the maximum height of the corresponding discrete wave form. For the linearized problem the objective function is similar. Since it is assumed that the discrete wave forms are centered on integers, the objective function is the sum of the $c_i$ values corresponding to the discrete wave form centers. Depending on which problem we are solving, we will either minimize or maximize this sum.

Figure 3:
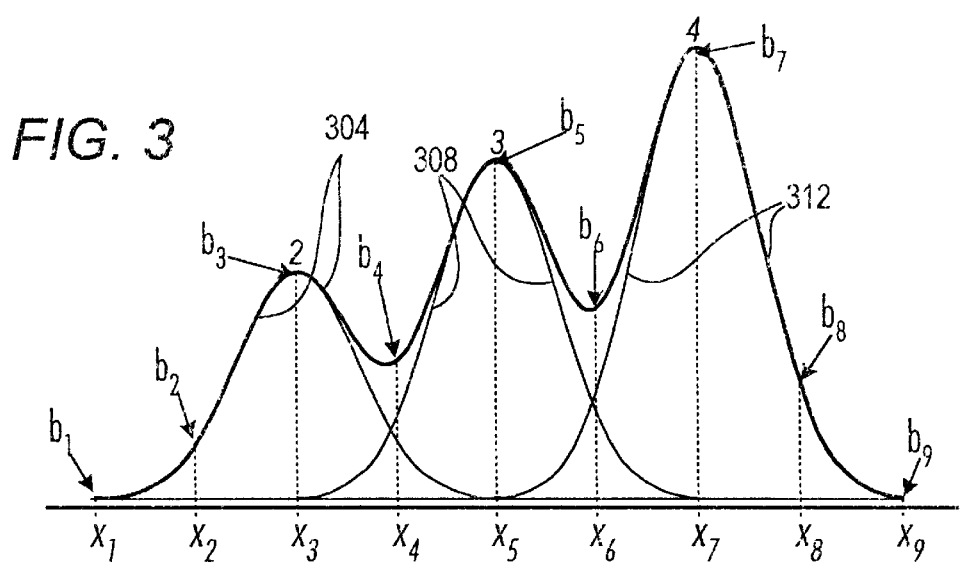
FIG. 3 illustrates a decomposition of a composite wave form into discrete wave forms 304, 308 and 312, wherein there is cross-talk between the discrete wave forms.

The constraints of the program are derived directly from the input data described above. For the maximization problem we restrict $f(\overline{x})$ to be less than or equal to $\overline{b}$. For the linearized maximization problem, this translates to a weighted sum of adjacent peaks being smaller than the observed $\overline{b}$. Similarly, for the minimization problem, we restrict $f(\overline{x})$ to be greater than or equal to $\overline{b}$, with the linearized minimization problem translating to a weighted sum of adjacent peaks being larger than the observed $\overline{b}$. Note that the weights for the weighted sum are derived for instantiations of g(x) of (1.2) with a known resolution. FIG. 3 may be used to illustrate how the constraints (2.1) and (2.2) form inequalities, which may be converted to a constraint matrix A as described hereinbelow.

If we assume that there is no cross-talk (meaning no contribution of one discrete wave form to another discrete wave form), then the value of $f(x_i)$ can be taken to be either less than or equal to, or greater than or equal to the value of $b_i$. Using the notation of FIG. 3 as an example would take the form for the maximization operation (2.2):

| | | |
|---|---|---|
| $f(x_3) \leq b_3$ | which linearizes to | $h \cdot c_3 \leq b_3$ |
| $f(x_5) \leq b_5$ | | $h \cdot c_5 \leq b_5$ |
| $f(x_7) \leq b_7$ | | $h \cdot c_7 \leq b_7$ |

Accordingly, as one skilled in the art will understand, an instance of the constraint matrix A can be provided, wherein values for the $c_i$ can be obtained by obtaining a solution to the following matrix equation: $A\overline{x}<=\overline{b}$. Moreover, when h=1, the associated constraint matrix A takes the following form (the $x_i$'s and the ci's are for notational convenience only and are not part of the matrix A), wherein corresponding columns for $c_1$, $c_2$, $c_4$, $c_6$, $c_8$, and $c_9$ are each the zero vector:

| | $c_3$ | $c_5$ | $c_7$ |
|---|---|---|---|
| $x_1$ | 0 | 0 | 0 |
| $x_2$ | 0 | 0 | 0 |
| $x_3$ | 1 | 0 | 0 |
| $x_4$ | 0 | 0 | 0 |
| $x_5$ | 0 | 1 | 0 |
| $x_6$ | 0 | 0 | 0 |
| $x_7$ | 0 | 0 | 1 |
| $x_8$ | 0 | 0 | 0 |
| $x_9$ | 0 | 0 | 0 |

However, note that in the above "no cross talk" case, there is virtually no advantage as compared to using the raw spectrum measurements since the optimal values will be identical (or at most a scalar multiple thereof) to those of the original $\overline{b}$ vector.

Augmentation of the constraints of (2.1) and (2.2) to include contributions from adjacent discrete wave forms to other discrete wave forms is called cross-talk. If we restrict the region of influence of each discrete wave to only those discrete wave forms that are within some predetermined distance, then this type of cross talk is called limited cross-talk. In FIG. 3, it is clear that both the first and second discrete wave forms (304 and 308 respectively) have a significant influence on the value of $x_5$, while the first wave form 304 has very little, if any, influence on the discrete wave form 312. If we translate these observations into a set of inequalities for the maximization operation (2.2) then we arrive at the following:

| | | |
|---|---|---|
| $f(x_1) \leq b_1$ | which linearizes to | $h_3 \cdot c_3 \leq b_1$ |
| $f(x_2) \leq b_2$ | | $h_2 \cdot c_3 \leq b_2$ |
| $f(x_3) \leq b_3$ | | $h_1 \cdot c_3 + h_3 \cdot c_5 \leq b_3$ |
| $f(x_4) \leq b_4$ | | $h_2 \cdot c_3 + h_2 \cdot c_5 \leq b_4$ |

-continued

| | |
|---|---|
| $f(x_5) \leq b_5$ | $h_3 \cdot c_3 + h_1 \cdot c_5 + h_3 \cdot c_7 \leq b_5$ |
| $f(x_6) \leq b_6$ | $h_2 \cdot c_5 + h_2 \cdot c_7 \leq b_6$ |
| $f(x_7) \leq b_7$ | $h_3 \cdot c_5 + h_1 \cdot c_7 \leq b_7$ |
| $f(x_8) \leq b_8$ | $h_2 \cdot c_7 \leq b_8$ |
| $f(x_9) \leq b_9$ | $h_3 \cdot c_7 \leq b_9$ | where $$h_1 = g(0), h_2 = g\left(\pm\frac{1}{2}\right), h_3 = g(\pm 1)$$

for g(x) as defined in (1.2).

The associated constraint matrix A would take the following form, wherein all other columns for $c_i$'s not presented are the zero vector:

| | $c_3$ | $c_5$ | $c_7$ |
|---|---|---|---|
| $x_1$ | $h_3$ | 0 | 0 |
| $x_2$ | $h_2$ | 0 | 0 |
| $x_3$ | $h_1$ | $h_3$ | 0 |
| $x_4$ | $h_2$ | $h_2$ | 0 |
| $x_5$ | $h_3$ | $h_1$ | $h_3$ |
| $x_6$ | 0 | $h_2$ | $h_2$ |
| $x_7$ | 0 | $h_3$ | $h_1$ |
| $x_8$ | 0 | 0 | $h_2$ |
| $x_9$ | 0 | 0 | $h_3$ |

If instead of limited cross talk, every discrete wave form instance can at least potentially influence every other discrete wave form instance in the composite wave form, then this type of cross talk is known as continuous cross talk. In particular, a very high and broad discrete wave form instance $I_i$ can have influence on a low intensity discrete wave form instance $I_j$ that is spaced apart from $I_i$ by a relatively large number of samples $x_k$. As in the limited cross talk case above, the constraints of (2.1) and (2.2) for the non-linearized embodiment are identical to the linearized version. However, when converting to the linearized embodiment in the continuous cross talk case, every discrete wave form instance is considered as contributing (at least potentially) to every other discrete wave form instance at every $b_i$. Since the inequalities associated with the minimization operation (2.1) are merely the reverse of the inequalities for the maximization operation (2.2) (i.e., "$\geq$" instead of "$\leq$"), only the equations for the maximization operation are provided:

| | | |
|---|---|---|
| $f(x_1) \leq b_1$ | which linearizes to | $h_3 \cdot c_3 + h_5 \cdot c_5 + h_7 \cdot c_7 \leq b_1$ |
| $f(x_2) \leq b_2$ | | $h_2 \cdot c_3 + h_4 \cdot c_5 + h_6 \cdot c_7 \leq b_2$ |
| $f(x_3) \leq b_3$ | | $h_1 \cdot c_3 + h_3 \cdot c_5 + h_5 \cdot c_7 \leq b_3$ |
| $f(x_4) \leq b_4$ | | $h_2 \cdot c_3 + h_2 \cdot c_5 + h_4 \cdot c_7 \leq b_4$ |
| $f(x_5) \leq b_5$ | | $h_3 \cdot c_3 + h_1 \cdot c_5 + h_3 \cdot c_7 \leq b_5$ |
| $f(x_6) \leq b_6$ | | $h_4 \cdot c_3 + h_2 \cdot c_5 + h_2 \cdot c_7 \leq b_6$ |
| $f(x_7) \leq b_7$ | | $h_5 \cdot c_3 + h_3 \cdot c_5 + h_1 \cdot c_7 \leq b_7$ |
| $f(x_8) \leq b_8$ | | $h_6 \cdot c_3 + h_4 \cdot c_5 + h_2 \cdot c_7 \leq b_8$ |
| $f(x_9) \leq b_9$ | | $h_7 \cdot c_3 + h_5 \cdot c_5 + h_3 \cdot c_7 \leq b_9$ | where $$h_1 = g(0), h_2 = g\left(\pm\frac{1}{2}\right), h_3 = g(\pm 1), h_4 = g\left(\pm 1\frac{1}{2}\right), h_5 = g(\pm 2),$$

$$h_6 = g\left(\pm 2\frac{1}{2}\right), h_7 = g(\pm 3).$$

The associated constraint matrix A would take the following form, wherein all other columns for $c_i$'s not presented are the zero vector:

| | $c_3$ | $c_5$ | $c_7$ |
|---|---|---|---|
| $x_1$ | $h_3$ | $h_5$ | $h_7$ |
| $x_2$ | $h_2$ | $h_4$ | $h_6$ |
| $x_3$ | $h_1$ | $h_3$ | $h_5$ |
| $x_4$ | $h_2$ | $h_2$ | $h_4$ |
| $x_5$ | $h_3$ | $h_1$ | $h_3$ |
| $x_6$ | $h_4$ | $h_2$ | $h_2$ |
| $x_7$ | $h_5$ | $h_3$ | $h_1$ |
| $x_8$ | $h_6$ | $h_4$ | $h_2$ |
| $x_9$ | $h_7$ | $h_5$ | $h_3$ |

Accordingly, the constraint matrix A becomes much more dense as we allow the influence of each peak instance to affect all other peak instances. In particular, the matrix A is not diagonally banded about the diagonal of A, instead at least one entire column has entirely non-zero entries.

In one embodiment of the present invention for performing mass spectrometry, the operations of (2.1) and (2.2) are implemented using an optimization algorithm based on the simplex method; in particular, the optimization algorithm used to provide solutions to the operation of (2.1) and (2.2) was the simplex algorithm in the software package Mathematica® 4.0 of Wolfram Research Inc., 100 Trade Center Drive, Champaign, Ill. 61820-7237 USA. Note that the standard form of such optimization problems that Mathematica uses is: minimize $z = \Sigma c_i \cdot x_i$ subject to $A\overline{x} \geq \overline{b}$ with $\overline{x} \geq 0$.

Note that the accompanying APPENDIX provided herewith provides Mathematica® 4.0 programs embodying the minimization and maximization operations (2.1) and (2.2) respectively. Further note that each program segment provided in the APPENDIX is immediately followed by an example output from the program segment to assist the reader in understanding the program segment.

Figure 4:
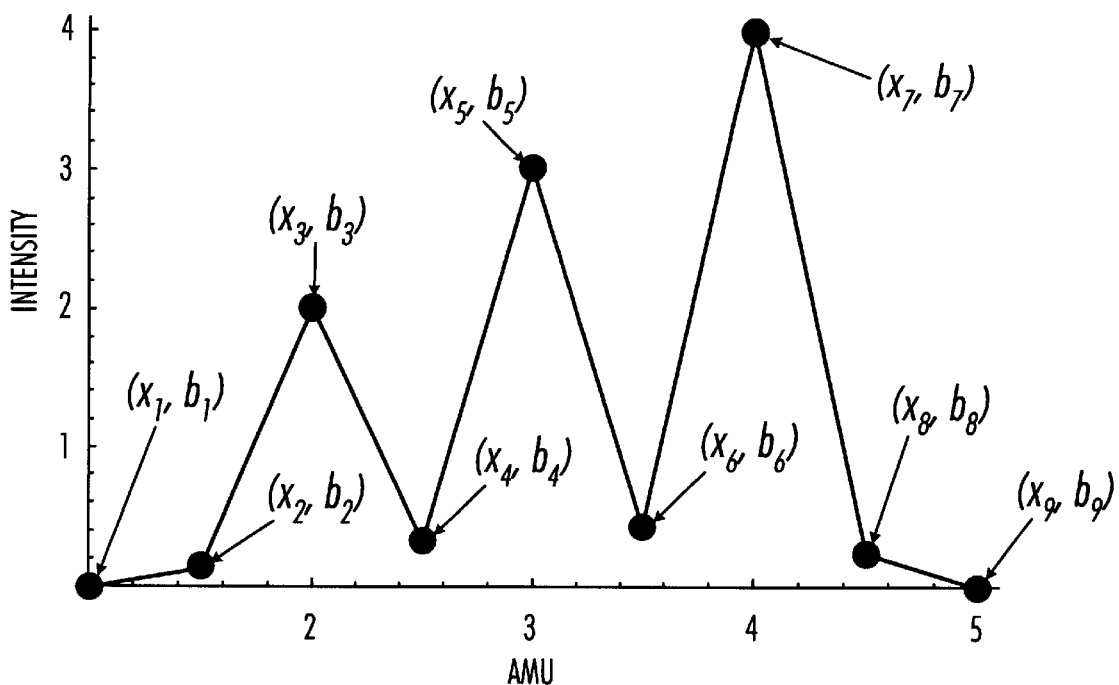
FIG. 4 is a graph of an idealized test set of a composite wave form with no random noise and a very high resolution (e.g., 0.5) upon which the minimization operation (2.1) and the maximization operation (2.2) are applied as an illustrative example of the signal processing steps performed by a linear programming embodiment of the present invention.

A description of the tests performed on the above described embodiment using the simplex method is presented hereinbelow. However, the various sets of test data used to evaluate the simplex based embodiment of operations (2.1) and (2.2) will be discussed first. Each set of test data for a simulated composite wave form was created by summing a plurality of Gaussian curves (i.e., discrete wave forms as shown by $f(\overline{x})$ in (1.1) above). The resulting sum was sampled at a rate of five equidistant points per unit in the input ($\overline{x}$) range. Random noise was then added to each corresponding intensity value to more closely mimic real data (i.e., data from a non-simulated signal generating process). The random noise was calculated as some percentage (e.g., 5%) of the intensity at each $x_i$. There were several different types of test data sets generated, each type was designed to test a different aspect of the performance of the present invention. For each of the test sets, three peaks were simulated, centered at units 2, 3, and 4 with intensities of 2, 3, and 4 respectively. An idealized test set with no random noise and a very high resolution (e.g., 0.5) is shown in FIG. 4.

Figure 5:
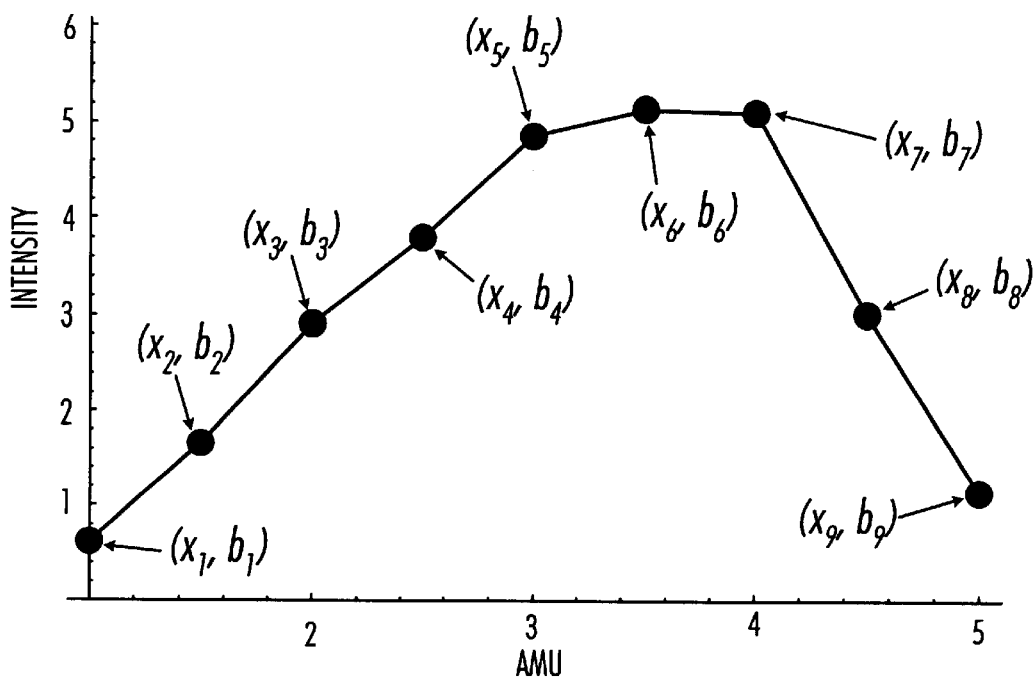
FIG. 5 is a graph of a low resolution test set ($TEST_1$) of a composite wave form. where intrusion of one discrete wave form instance on the next is considerable. In particular, the width at half maximum intensity known in the art as Full-Width-Half-Max (FWHM) is set to 1.5 units for this test set. This translates into approximately 30% of the intensity of one peak still being present in an adjacent peak's maximal value.

Low resolution data often occurs as a result of hardware limitations. To test low resolution data where intrusion of one discrete wave form instance on the next is considerable, the width at half maximum intensity known in the art as Full-Width-Half-Max (FWHM) was set to 1.5 units. This translates to approximately 30% of the intensity of one peak still being present in an adjacent peak's maximal value. A test set having this low resolution characteristic is shown in FIG. 5 and will be referred to as $TEST_1$.

Figure 6:
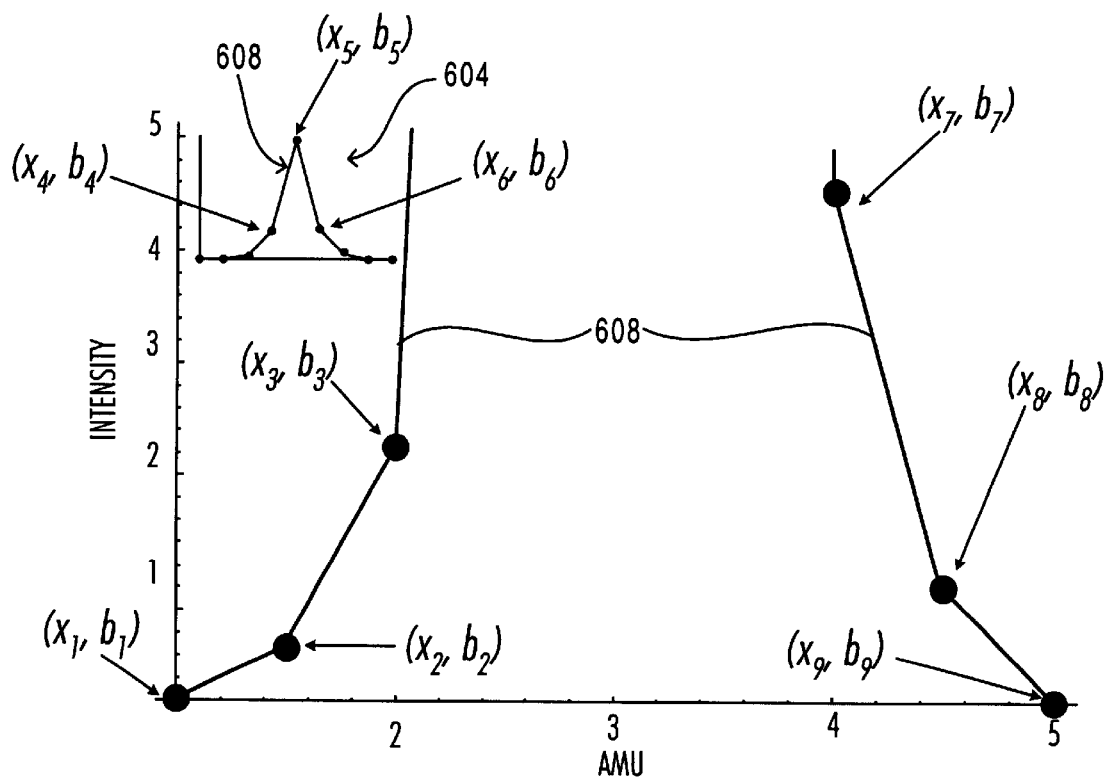
FIG. 6 is a graph of a low resolution test set ($TEST_2$) of a composite wave form. where one peak is much stronger than an adjacent peak. Often when this occurs, the smaller peak is masked in the composite wave form so that it is not detectable. In addition, the contribution of the larger peak may extend noticeably to non-adjacent weak peaks. To simulate such a condition, the resolution of the $TEST_2$ test set is set to 0.7 FWHM units (wherein there was only 0.35% intrusion of one peak on the next), and the intensity of the middle peak is 100. Note that a scaled down version of the graph is also provided in this figure so that the entire graph can be represented.

When one peak is much stronger than an adjacent peak, often the smaller peak is masked in a composite wave form instance so that it is not detectable. In addition, the contribution of the larger peak may extend noticeably to non-adjacent weak peaks. To simulate such a condition in a test data set, the resolution was set to 0.7 FWHM units (wherein there was only 0.35% intrusion of one peak on the next), and the intensity of the middle peak will be changed from 3 to 100. The test set is shown in FIG. 6 and will be referred to as $TEST_2$. Note that 604 shows a reduced size full copy of the graph 608 of the composite wave form instance. As shown in this figure, the adjacent peaks at 2 and 4 x-units are substantially masked by the large peak at 3 units.

Figure 7:
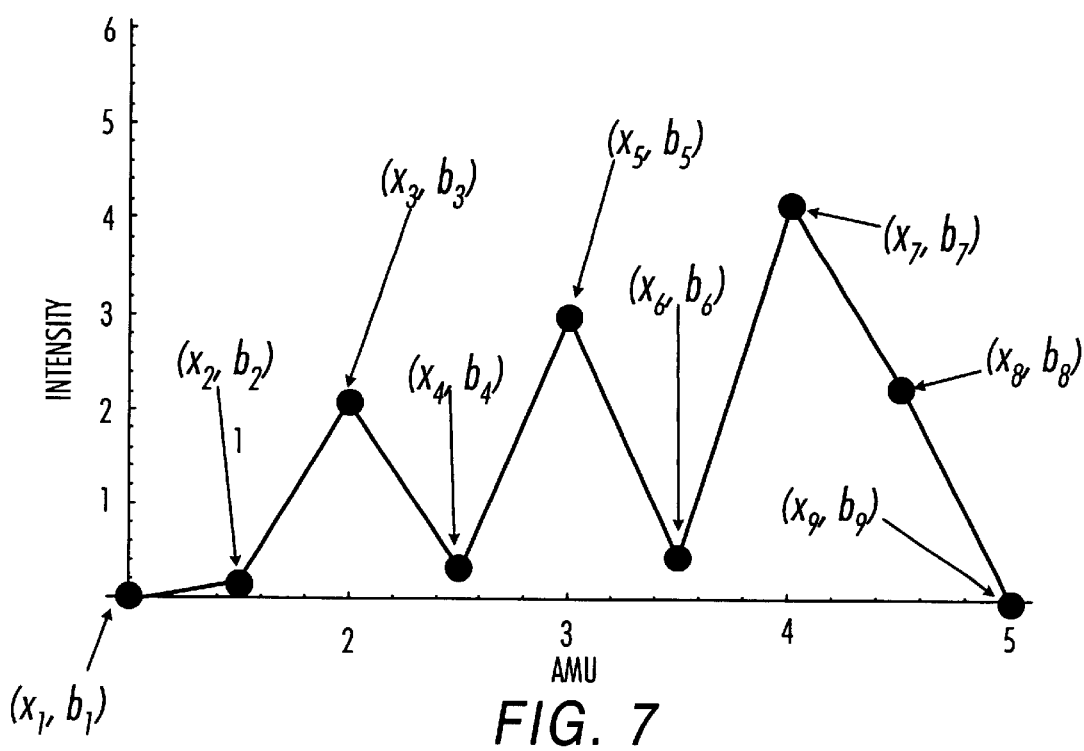
FIG. 7 is a graph of a test set ($TEST_3$) of a composite wave form. where this test set includes a spike of 2 intensity units added to $b_8$. The resolution is set to 0.5 FWHM units (only 0.0015% intrusion of one peak to the next).

The test set shown in FIG. 7 includes a spike of 2 intensity units added to $b_8$. The resolution is set to 0.5 FWHM units (only 0.0015% intrusion of one peak to the next). This test set is referred to as $TEST_3$.

Figure 8:
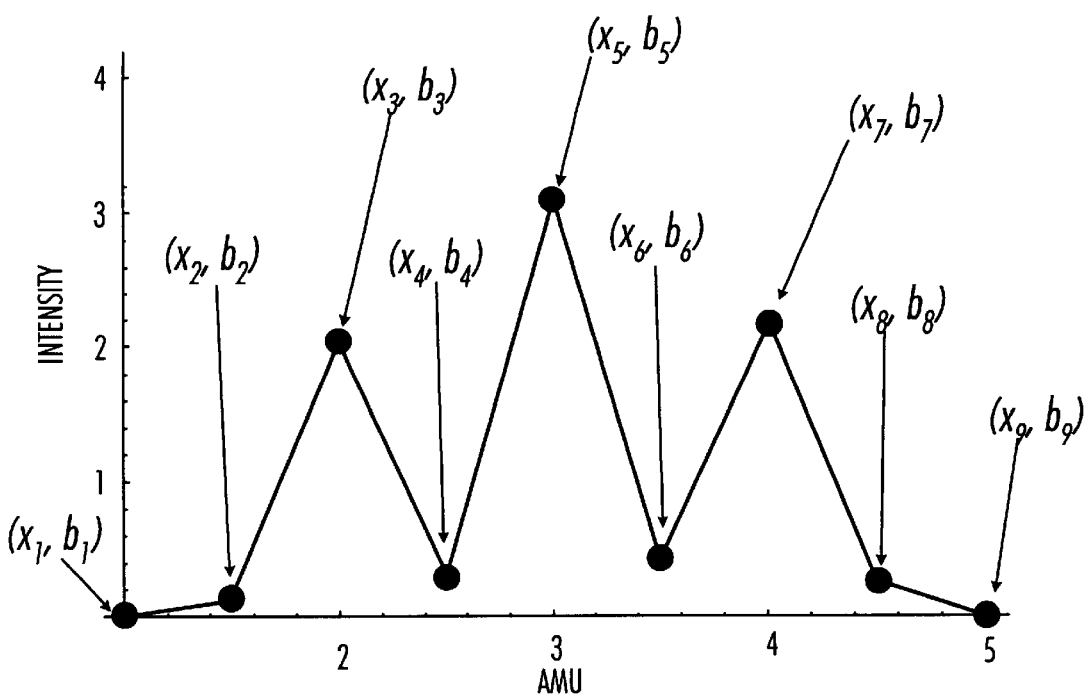
FIG. 8 is a graph of a test set ($TEST_4$) of a composite wave form. where this test set includes a decrease of 2 intensity units (a gap) at $b_7$ (the middle of the third peak). The resolution for this data set is set to 0.5 FWHM units (only 0.0015% intrusion of one peak to the next).

The test set shown in FIG. 8 includes a decrease of 2 intensity units (a gap) at $b_7$ (the middle of the third peak). The resolution for this data set is set to 0.5 FWHM units (only 0.0015% intrusion of one peak to the next). This test set is referred to as $TEST_4$.

Figure 9:
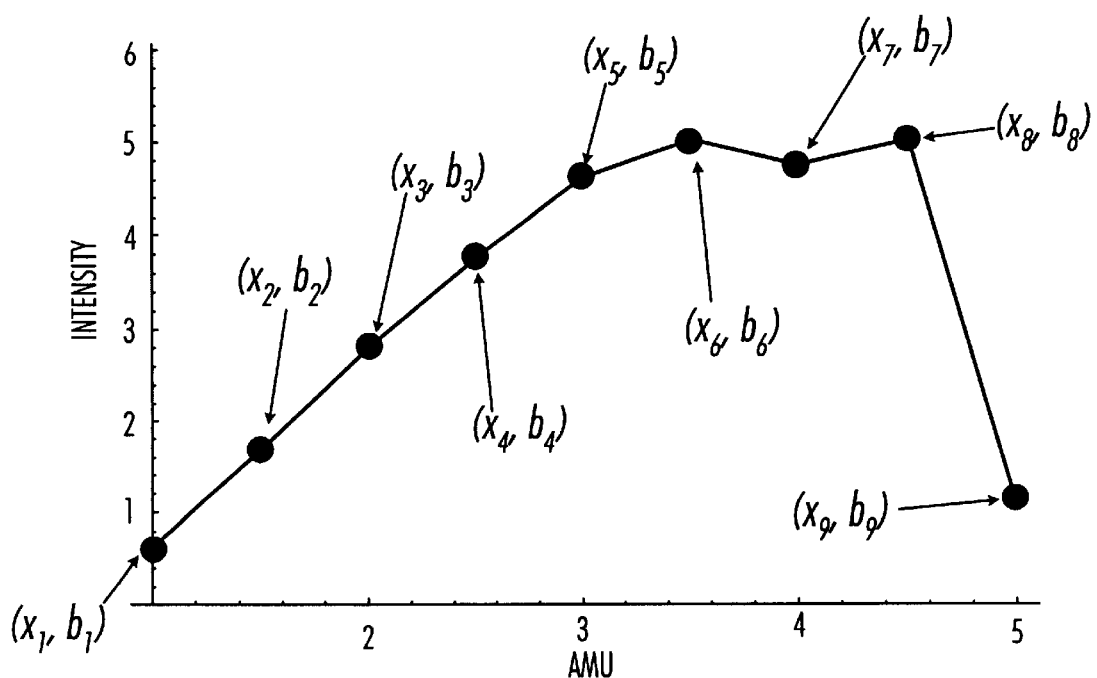
FIG. 9 is a graph of a test set ($TEST_5$) of a composite wave form. where this test set includes both poor resolution and a positive noise spike (which in mass spectrometry is more likely than a negative spike). Accordingly, this test set tests the performance of the linear programming embodiment of the present invention under conditions that more closely mimic reality. The resolution of this test set is 1.5 FWHM (which implies a 30% intrusion of one peak on the next) and a positive noise spike of 2 has been added to $b_8$.

The test set shown in FIG. 9 includes both poor resolution and a positive noise spike (which in mass spectrometry is more likely than a negative spike). Accordingly, this test set tests the performance of the linear programming embodiment of the present invention under conditions that more closely mimic reality. The resolution will be set to 1.5 FWHM (30% intrusion of one peak to the next) and a positive noise spike of 2 will be added to $b_8$. This test set is referred to as $TEST_5$.

Implementation of LP on the Test Data Sets

In this section, the results of both the minimization and maximization operations of (2.1) and (2.2) described. The results are provided for the limited and continuous cross-talk models only since the model having no cross-talk is substantially identical to the original input data. FIGS. 10 through 19 graphically illustrate the results of applying minimization and maximization operations to the data test sets $TEST_1$ through $TEST_5$. In each of the graphs, the f(x) generated according to (1.1) from the minimization operation (2.1) is labeled "MIN", while the f(x) generated according to (1.1) from maximization operation (2.2) are labeled "MAX". The dashed graphs represent the reconstructed distribution of instances of discrete wave forms obtained from the $c_i$'s determined by the minimization and maximization operations. In particular, the dashed graphs labeled $P_{MIN}$ are the instances of the discrete wave forms obtained from decomposing the MIN curve, and the graphs labeled $P_{MAX}$ are the instances of the discrete wave forms obtained from decomposing the MAX curve.

In general, upon viewing all the FIGS. 10 through 19, the continuous cross-talk fits the initial input data of each test data set only slightly better than the limited cross-talk with the maximization and minimization operations fitting to the input data substantially equally in the continuous cross-talk and limited cross-talk cases. Each of the FIGS. 10 through 19 will now be discussed.

Figure 10:
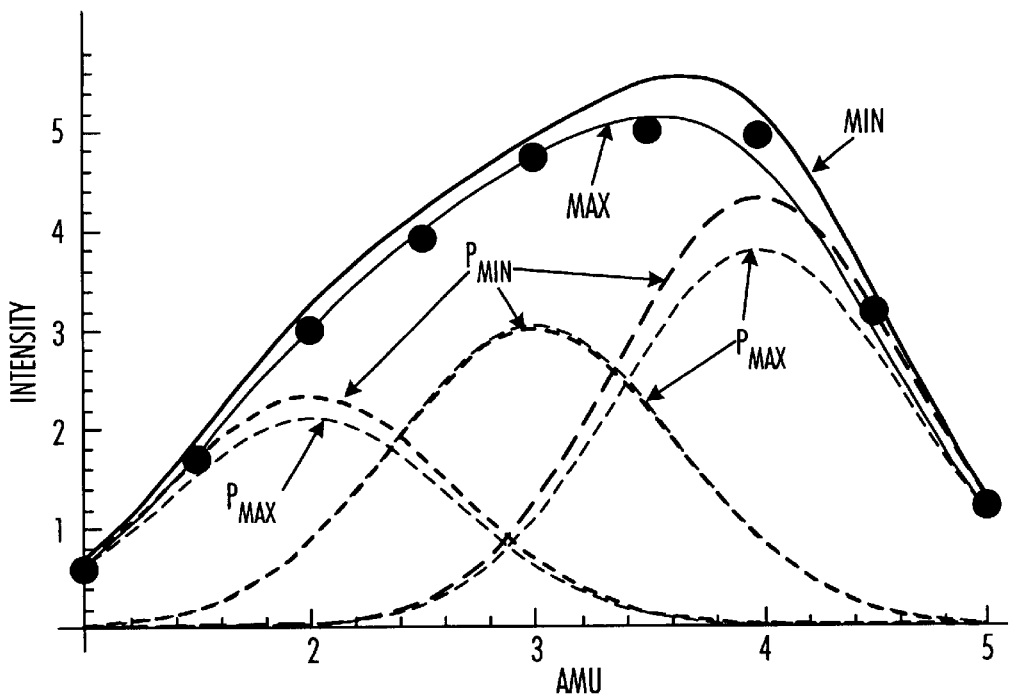
FIG. 10 shows various graphs of data generated by the present invention when it is assumed that there is limited cross-talk between the discrete wave forms into which the composite wave form (represented by test set $TEST_1$) is decomposed. More particularly, the following graphs are illustrated in this figure: (a) a graph of the function f(x) defined in (1.1) as determined by the minimization operation (2.1) applied to test set TEST, (this graph is labeled "MIN"), (b) graphs of the corresponding discrete wave forms obtained from the minimization operation (2.1) (each of these graphs is labeled "$P_{MIN}$"); (c) a graph of the function f(x) defined in (1.1) as determined by the maximization operation (2.2) applied to test set $TEST_1$ (this graph is labeled "MAX"), and (d) graphs of the corresponding discrete wave forms obtained from the maximization operation (2.2) (each of these graphs is labeled "$P_{MAX}$").
Figure 11:
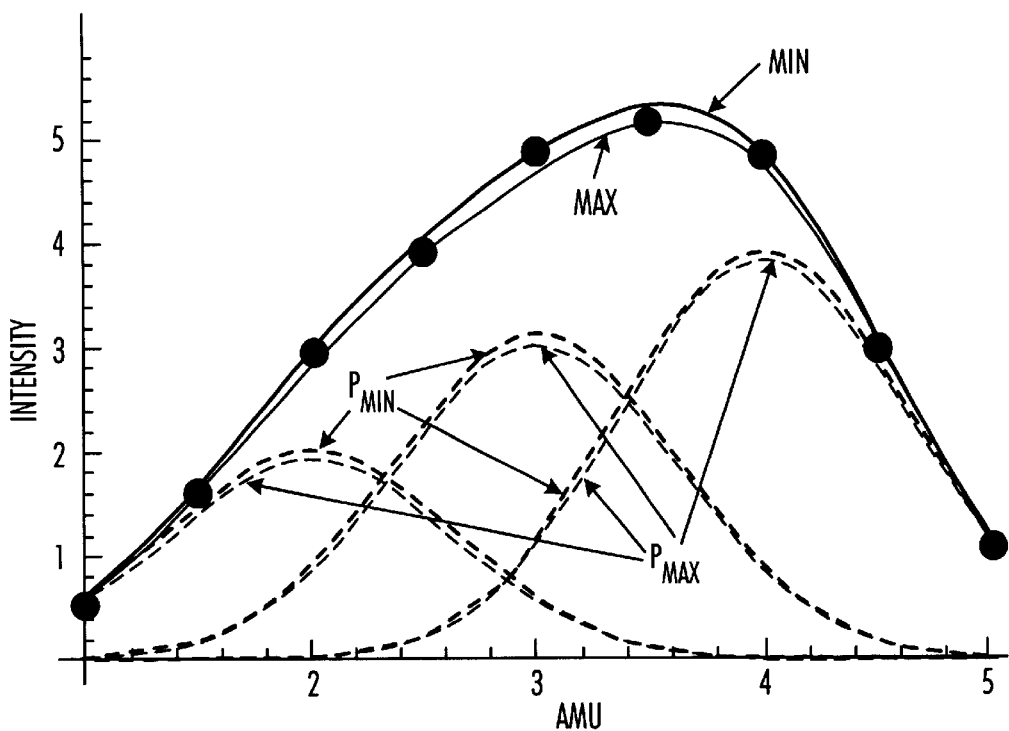
FIG. 11 shows various graphs of data generated by the present invention when it is assumed that there is continuous cross-talk between the discrete wave forms into which the composite wave form (represented by test set $TEST_1$) is decomposed. More particularly, the following graphs are illustrated in this figure: (a) a graph of the function f(x) defined in (1.1) as determined by the minimization operation (2.1) applied to test set $TEST_1$ (this graph is labeled "MIN"), (b) graphs of the corresponding discrete wave forms obtained from the minimization operation (2.1) (each of these graphs is labeled "$P_{MIN}$"); (c) a graph of the function f(x) defined in (1.1) as determined by the maximization operation (2.2) applied to test set $TEST_1$ (this graph is labeled "MAX"), and (d) graphs of the corresponding discrete wave forms obtained from the maximization operation (2.2) (each of these graphs is labeled "$P_{MAX}$").

FIGS. 10 and 11 were obtained from the test data set $TEST_1$ for the limited and continuous cross-talk respectively, wherein for the limited cross-talk, each discrete wave form is limited to have effect at most one mass unit away. The difference between the fits of the corresponding MIN and MAX is substantially constant and corresponds to the 5% random variation in the data.

Figure 12:
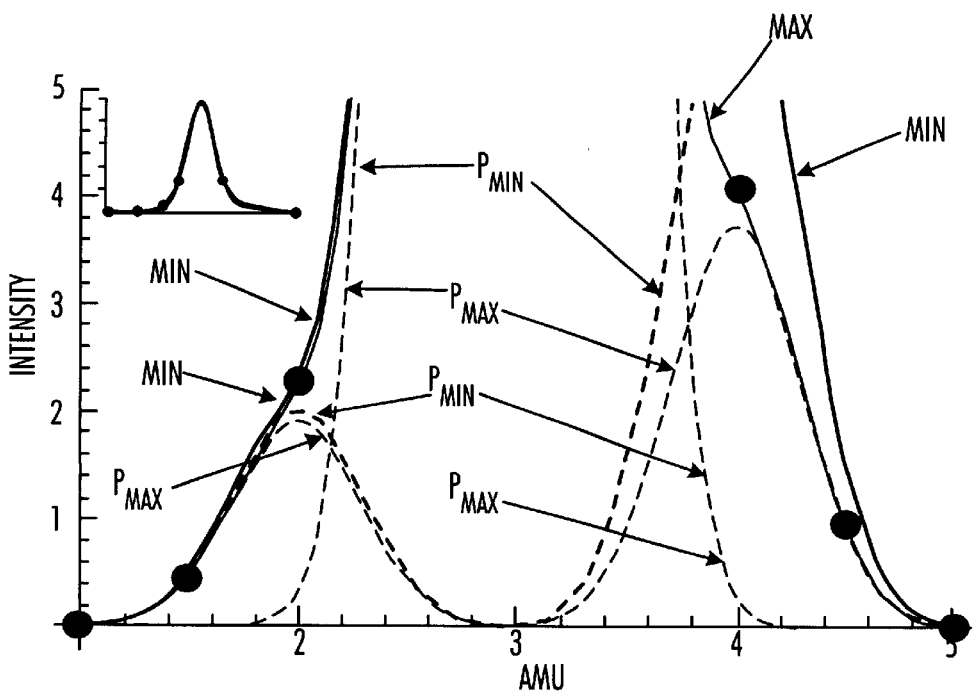
FIG. 12 shows various graphs of data generated by the present invention when it is assumed that there is limited cross-talk between the discrete wave forms into which the composite wave form (represented by test set $TEST_2$) is decomposed. More particularly, the following graphs are illustrated in this figure: (a) a graph of the function f(x) defined in (1.1) as determined by the minimization operation (2.1) applied to test set $TEST_2$ (this graph is labeled "MIN"), (b) graphs of the corresponding discrete wave forms obtained from the minimization operation (2.1) (each of these graphs is labeled "$P_{MIN}$"); (c) a graph of the function f(x) defined in (1.1) as determined by the maximization operation (2.2) applied to test set $TEST_2$ (this graph is labeled "MAX"), and (d) graphs of the corresponding discrete wave forms obtained from the maximization operation (2.2) (each of these graphs is labeled "$P_{MAX}$"). Note that a scaled down version of these graphs is also provided in this figure so that the entire graph of each of (a) and (c) can be represented.
Figure 13:
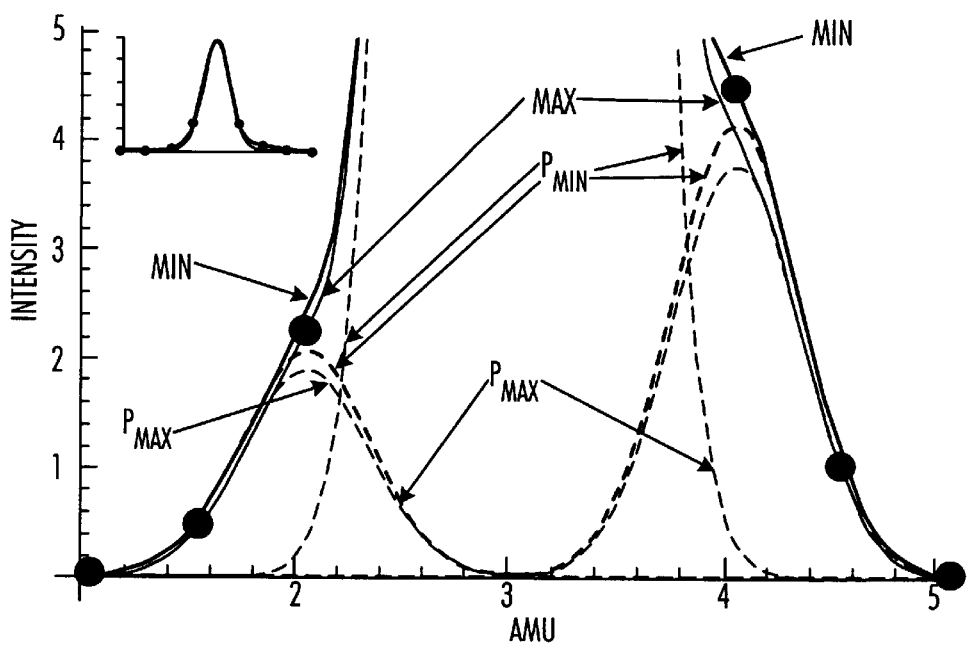
FIG. 13 shows various graphs of data generated by the present invention when it is assumed that there is continuous cross-talk between the discrete wave forms into which the composite wave form (represented by test set $TEST_2$) is decomposed. More particularly, the following graphs are illustrated in this figure: (a) a graph of the function f(x) defined in (1.1) as determined by the minimization operation (2.1) applied to test set $TEST_2$ (this graph is labeled "MIN"), (b) graphs of the corresponding discrete wave forms obtained from the minimization operation (2.1) (each of these graphs is labeled "$P_{MIN}$"); (c) a graph of the function f(x) defined in (1.1) as determined by the maximization operation (2.2) applied to test set $TEST_2$ (this graph is labeled "MAX"), and (d) graphs of the corresponding discrete wave forms obtained from the maximization operation (2.2) (each of these graphs is labeled "$P_{MAX}$"). Note that a scaled down version of these graphs is also provided in this figure so that the entire graph of each of (a) and (c) can be represented.

FIGS. 12 and 13 were obtained from the test data set $TEST_2$ for the limited and continuous cross-talk respectively, wherein for the limited cross-talk, each discrete wave form is limited to have effect at most one mass unit away. The continuous cross-talk performs significantly better than the limited cross-talk with the maximization and minimization operations performing substantially equally in the continuous and the maximization producing better results in the limited cross-talk case. The difference between the fits is relatively large in the right most $P_{MIN}$ peak and the right most $P_{MAX}$ peak in the limited cross-talk case (FIG. 12).

Figure 14:
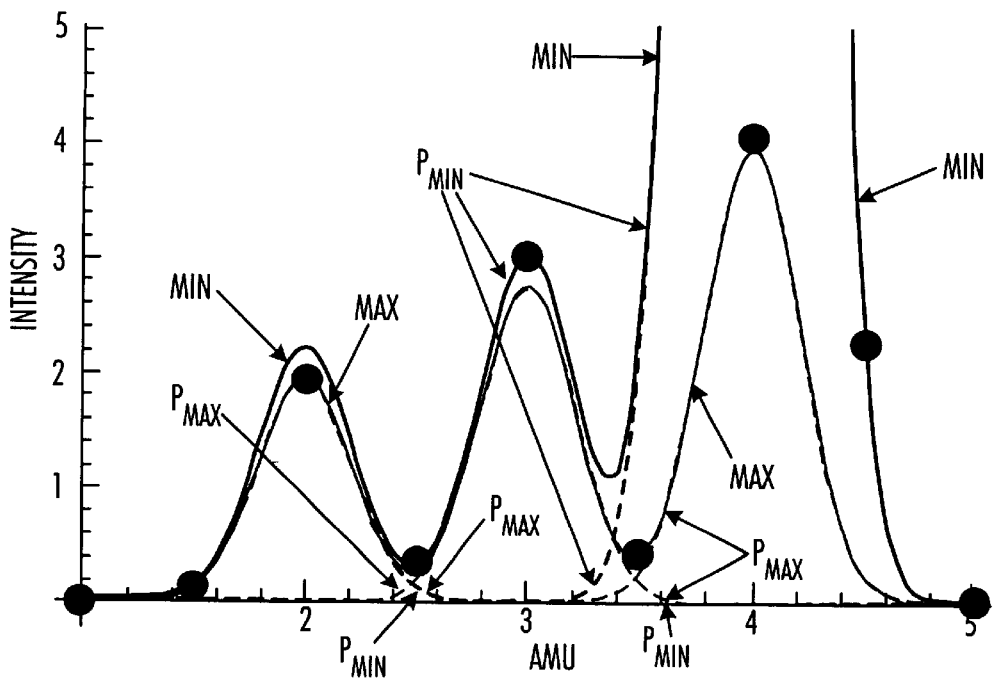
FIG. 14 shows various graphs of data generated by the present invention when it is assumed that there is limited cross-talk between the discrete wave forms into which the composite wave form (represented by test set $TEST_3$) is decomposed. More particularly, the following graphs are illustrated in this figure: (a) a graph of the function f(x) defined in (1.1) as determined by the minimization G operation (2.1) applied to test set $TEST_3$ (this graph is labeled "MIN"), (b) graphs of the corresponding discrete wave forms obtained from the minimization operation (2.1) (each of these graphs is labeled "$P_{MIN}$"); (c) a graph of the function f(x) defined in (1.1) as determined by the maximization operation (2.2) applied to test set $TEST_3$ (this graph is labeled "MAX"), and (d) graphs of the corresponding discrete wave forms obtained from the maximization operation (2.2) (each of these graphs is labeled "$P_{MAX}$").
Figure 15:
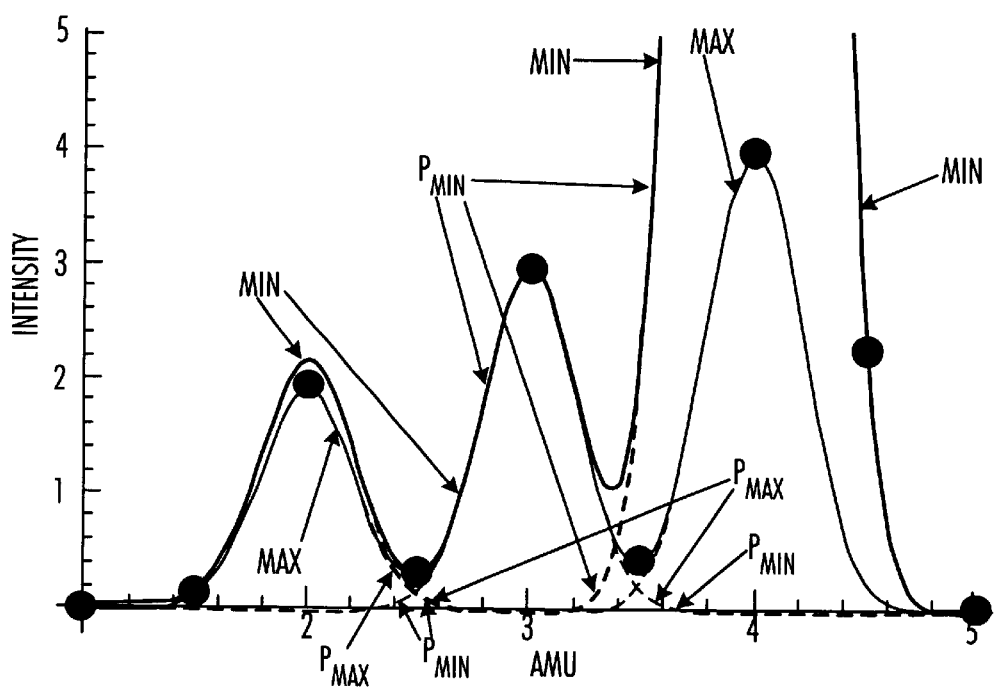
FIG. 15 shows various graphs of data generated by the present invention when it is assumed that there is continuous cross-talk between the discrete wave forms into which the composite wave form (represented by test set $TEST_3$) is decomposed. More particularly, the following graphs are illustrated in this figure: (a) a graph of the function f(x) defined in (1.1) as determined by the minimization operation (2.1) applied to test set $TEST_3$ (this graph is labeled "MIN"), (b) graphs of the corresponding discrete wave forms obtained from the minimization operation (2.1) (each of these graphs is labeled "$P_{MIN}$"); (c) a graph of the function f(x) defined in (1.1) as determined by the maximization operation (2.2) applied to test set $TEST_3$ (this graph is labeled "MAX"), and (d) graphs of the corresponding discrete wave forms obtained from the maximization operation (2.2) (each of these graphs is labeled "$P_{MAX}$").

FIGS. 14 and 15 were obtained from the test data set $TEST_3$ for the limited and continuous cross-talk respectively, wherein for the limited cross-talk, each discrete wave form is limited to have effect at most one mass unit away. In both the limited and continuous cases, the maximization operation performs significantly better than the minimization operation. The primary difference between the fits of f(x) determined by the minimization operation (2.1) and the maximization operation (2.2) is illustrated by the difference in the right most $P_{MIN}$ peak and the right most $P_{MAX}$ peak.

Figure 16:
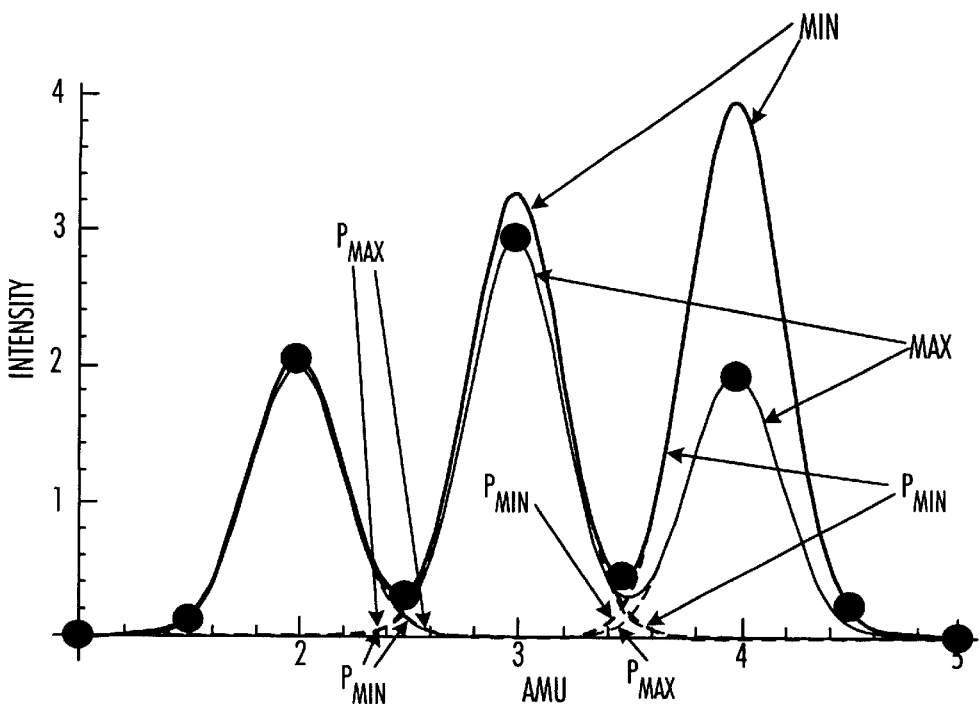
FIG. 16 shows various graphs of data generated by the present invention when it is assumed that there is limited cross-talk between the discrete wave forms into which the composite wave form (represented by test set $TEST_4$) is decomposed. More particularly, the following graphs are illustrated in this figure: (a) a graph of the function f(x) defined in (1.1) as determined by the minimization operation (2.1) applied to test set $TEST_4$ (this graph is labeled "MIN"), (b) graphs of the corresponding discrete wave forms obtained from the minimization operation (2.1) (each of these graphs is labeled "$P_{MIN}$"); (c) a graph of the function f(x) defined in (1.1) as determined by the maximization operation (2.2) applied to test set $TEST_4$ (this graph is labeled "MAX"), and (d) graphs of the corresponding discrete wave forms obtained from the maximization operation (2.2) (each of these graphs is labeled "$P_{MAX}$").
Figure 17:
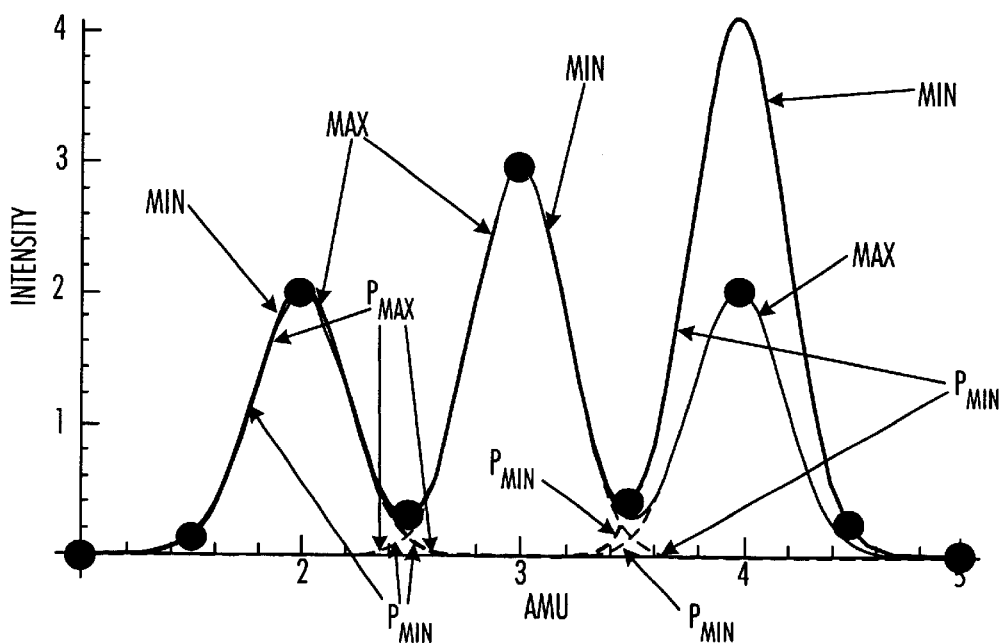
FIG. 17 shows various graphs of data generated by the present invention when it is assumed that there is continuous cross-talk between the discrete wave forms into which the composite wave form (represented by test set $TEST_4$) is decomposed. More particularly, the following graphs are illustrated in this figure: (a) a graph of the function f(x) defined in (1.1) as determined by the minimization operation (2.1) applied to test set $TEST_4$ (this graph is labeled "MIN"), (b) graphs of the corresponding discrete wave forms obtained from the minimization operation (2.1) (each of these graphs is labeled "$P_{MIN}$"); (c) a graph of the function f(x) defined in (1.1) as determined by the maximization operation (2.2) applied to test set $TEST_4$ (this graph is labeled "MAX"), and (d) graphs of the corresponding discrete wave forms obtained from the maximization operation (2.2) (each of these graphs is labeled "$P_{MAX}$").

FIGS. 16 and 17 were obtained from the test data set $TEST_4$ for the limited and continuous cross-talk respectively, wherein for the limited cross-talk, each discrete wave form is limited to have effect at most one mass unit away. In both the limited and continuous cases, the minimization operation performs significantly better than the maximization operation. The primary difference between the fits of f(x) determined by the minimization operation (2.1) and the maximization operation (2.2) is illustrated by the difference in the right most portion of each graph.

Figure 18:
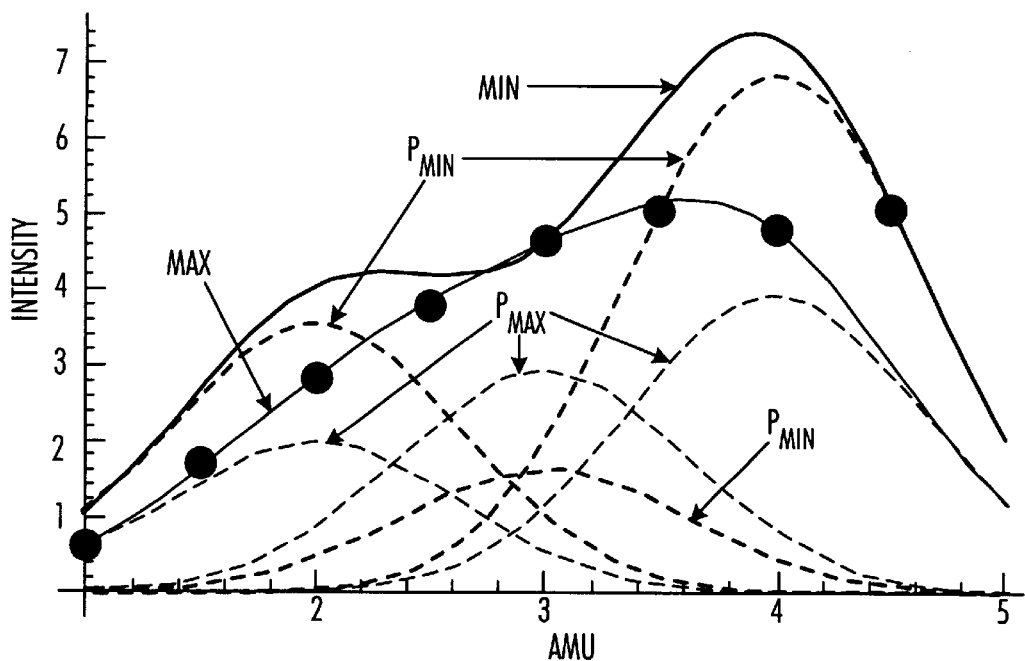
FIG. 18 shows various graphs of data generated by the present invention when it is assumed that there is limited cross-talk between the discrete wave forms into which the composite wave form (represented by test set $TEST_5$) is decomposed. More particularly, the following graphs are illustrated in this figure: (a) a graph of the function f(x) defined in (1.1) as determined by the minimization operation (2.1) applied to test set $TEST_5$ (this graph is labeled "MIN"), (b) graphs of the corresponding discrete wave forms obtained from the minimization operation (2.1) (each of these graphs is labeled "$P_{MIN}$"); (c) a graph of the function f(x) defined in (1.1) as determined by the maximization operation (2.2) applied to test set $TEST_5$ (this graph is labeled "MAX"), and (d) graphs of the corresponding discrete wave forms obtained from the maximization operation (2.2) (each of these graphs is labeled "$P_{MAX}$").
Figure 19:
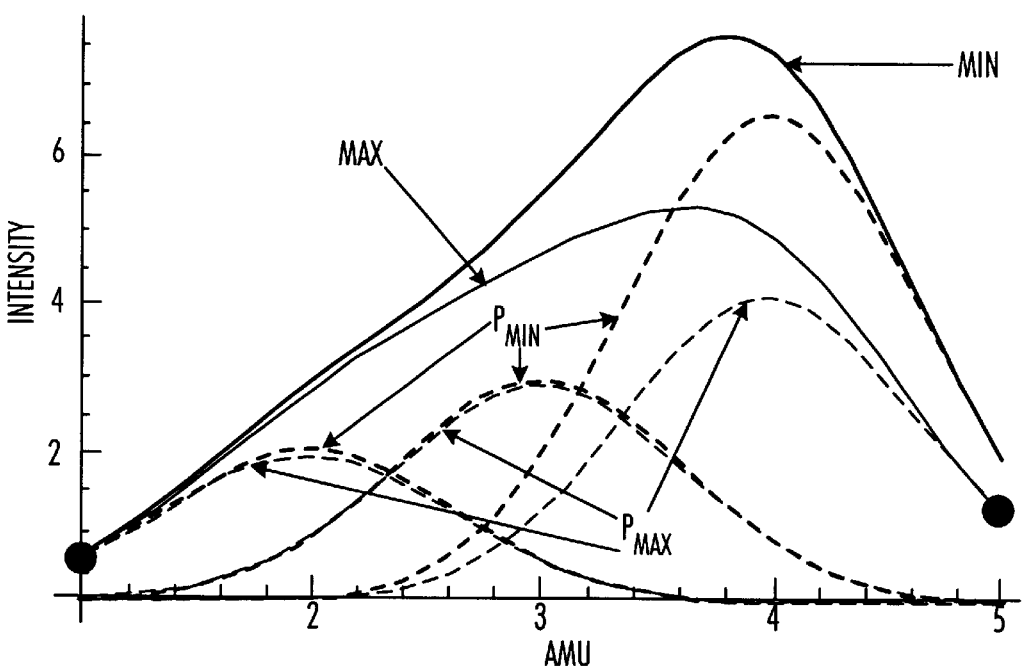
FIG. 19 shows various graphs of data generated by the present invention when it is assumed that there is continuous cross-talk between the discrete wave forms into which the composite wave form (represented by test set $TEST_5$) is decomposed. More particularly, the following graphs are illustrated in this figure: (a) a graph of the function f(x) defined in (1.1) as determined by the minimization operation (2.1) applied to test set $TEST_5$ (this graph is labeled "MIN"), (b) graphs of the corresponding discrete wave forms obtained from the minimization operation (2.1) (each of these graphs is labeled "$P_{MIN}$"); (c) a graph of the function f(x) defined in (1.1) as determined by the maximization operation (2.2) applied to test set $TEST_5$ (this graph is labeled "MAX"), and (d) graphs of the corresponding discrete wave forms obtained from the maximization operation (2.2) (each of these graphs is labeled "$P_{MAX}$").

FIGS. 18 and 19 were obtained from the test data set $TEST_5$ for the limited and continuous cross-talk respectively, wherein for the limited cross-talk, each discrete wave form is limited to have effect at most one mass unit away. In both the limited and continuous cases, the maximization operation performs significantly better than the minimization operation. The difference between the fits of the MIN and MAX is relatively large at the left most and right most pair of $P_{MIN}$ and $P_{MAX}$ for the limited cross-talk case, but only at the right most pair of $P_{MIN}$ and $P_{MAX}$ for the continuous cross-talk case.

The graphical results shown in FIGS. 10–19 illustrate that the continuous cross-talk models always outperformed the limited cross-talk models. Moreover, it can be empirically demonstrated that in some applications of mass spectrometry (e.g., determining the purity of a particular substance) that cross-talk can occur at distances further than 1 mass unit away from a peak and therefore necessitate the use of cross-talk which is further-reaching than the limited cross talk case. In general it should typically not be necessary to utilize a continuous cross-talk model, but instead a model wherein the cross-talk extends far enough to where the contribution of one peak to another is less than, e.g., 0.001% to 1% of the smaller peak's value. Additionally, from tests performed by the Applicant for mass spectrometry, the maximization operation has proved to be more accurate in representing the input mass spectrometry data, except for the noise gap problem where the minimization operation was clearly better. Since gap noise is more rare, in general the maximization operation algorithm is preferred for mass spectrometry analysis. However, for other applications where gap noise is more dominant, the minimization operation may be preferred. For example, in such signal processing applications as absorbance spectroscopy the minimization operation (2.1) may be preferred as one skilled in the art will understand.

It is also an aspect of the present invention to utilize both the minimization and maximization operations together on the same input data set. For example, there are various techniques in the art for reliably determining the centers (e.g., extreme points, or more generally, a predetermined region of a wave form) of the discrete wave forms. In particular, such points/regions may be determined using, e.g., derivatives, and weighted averaging as one skilled in the art will understand. Accordingly, a pair $P_{MIN}$ and $P_{MAX}$ can be generated for each center. Accordingly, for each discrete wave form center, the corresponding pair of discrete wave forms $P_{MIN}$ and $P_{MAX}$ may be used to obtain a resulting discrete wave form. In particular, for each center, a resulting discrete wave form may be derived:

(a) As a weighted combination of the corresponding pair of discrete wave forms, or (b) By selecting one of the discrete wave forms $P_{MIN}$ and $P_{MAX}$ of the corresponding pair.

In either case, a determination can be made as to which one of the discrete wave forms $P_{MIN}$ and $P_{MAX}$ of the corresponding pair appears to determine the composite function, such as f(x) of (1.1), that bests the original input data $(x_i, b_i)$. Moreover, there are numerous techniques for making such a determination. In one embodiment wherein a linear programming technique is used to linearly approximate f(x) for both the minimization and maximization operations as described hereinabove, such a determination can be made for a center $x_0$ (having $P_{MIN(0)}$ and $P_{MAX(0)}$ as its corresponding discrete wave forms) by using $x_i$ of an input pair $(x_i, b_i)$ relatively close to $x_0$ as a replacement center for $x_0$ and subsequently re-perform the minimization and maximization operations to obtain new versions of the discrete wave forms $P_{MIN(i)}$ and $P_{MAX(i)}$. Thus, if the original center $x_0$ happened to correspond to a spike or a gap, then by using the nearby value $x_i$ as a replacement center (presumably not a spike or a gap), one of the newly derived corresponding discrete wave forms $P_{MIN(i)}$ and $P_{MAX(i)}$ will likely change amplitude dramatically from that of the respective $P_{MIN(0)}$ and $P_{MAX(0)}$, while the difference between the other one of $P_{MIN(i)}$ and $P_{MAX(i)}$ and its respective $P_{MIN(0)}$ and $P_{MAX(0)}$ will change relatively little. Thus, the one of $P_{MIN(0)}$ and $P_{MAX(0)}$ that deviates least from its newer version is determined to be most indicative of the true non-noise reading at $x_0$ for the application (e.g., mass spectrometry assays). Accordingly, the weights for the discrete wave forms at $x_0$ referred to in (a) above may be determined to depend inversely on the differences between the corresponding original and new off center versions of the discrete wave forms. For instance, the resulting discrete wave form for $x_0$ could be, e.g., a weighting function may take the results of the minimization operation $P_{MIN(0)}$ and the results of the maximization problem $P_{MAX(0)}$ and combine them so that the weighting function is one of:

$$P=(P_{MIN(0)}+P_{MAX(0)})/2; \quad (i)$$

$$P=((P_{MIN(0)}\hat{}2+P_{MAX(0)}\hat{}2)\hat{}1/2)/2; \quad (ii)$$

or $$P=((P_{MIN(0)}\hat{}3+P_{MAX(0)}\hat{}3)\hat{}1/3)/2. \quad (iii)$$

Alternatively, in (b) immediately above, the one of $P_{MIN(0)}$ and $P_{MAX(0)}$ that deviates least from its newer version is determined to be most indicative of the true non-noise reading at $x_0$ and is therefore selected as the discrete wave form for $x_0$.

Figure 20A:
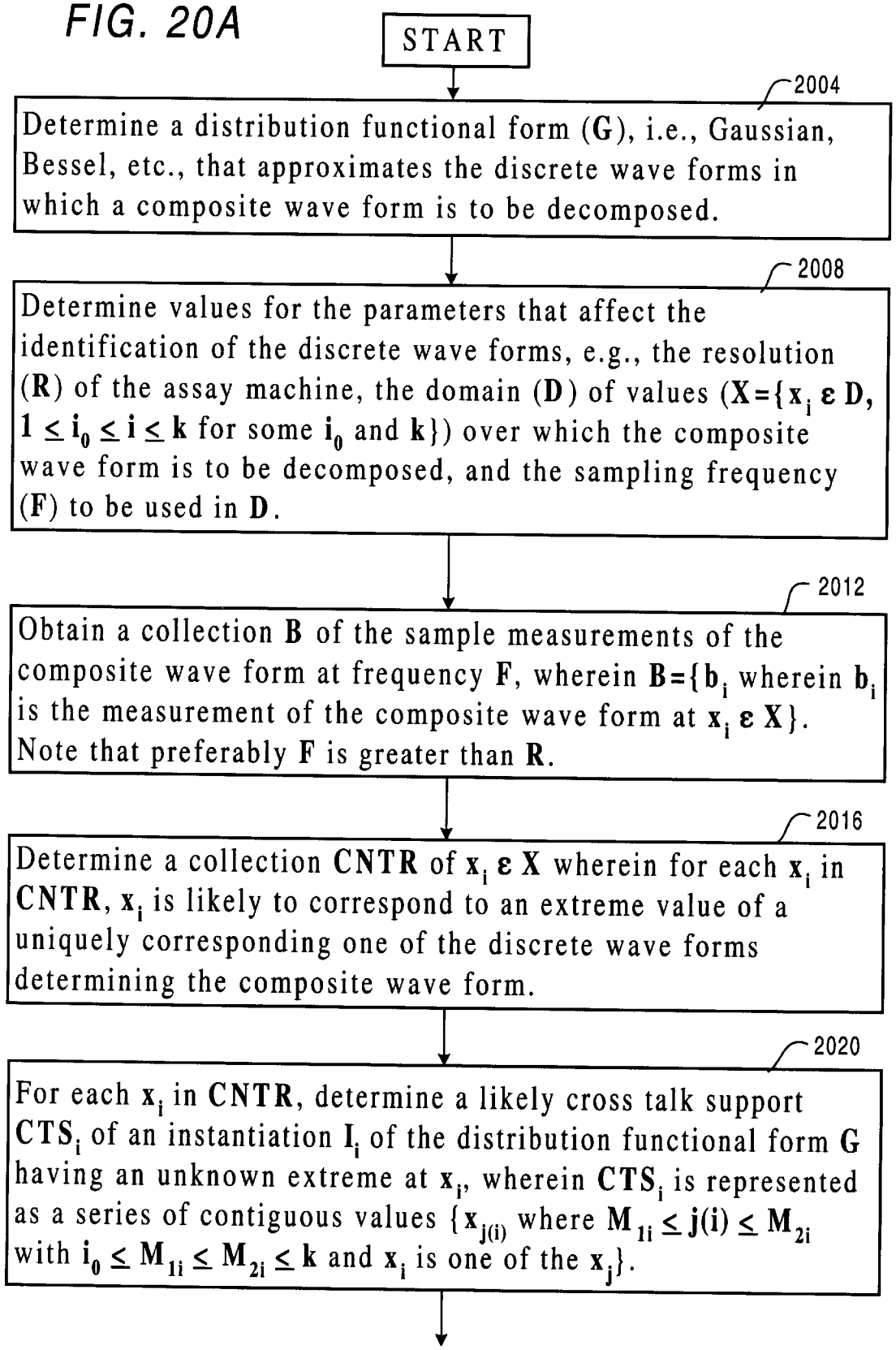

FIGS. 20A through 20C is a high level flowchart of the steps performed by the present invention for decomposing a composite wave form into a plurality of discrete wave forms. Note, that the steps of this flowchart are preferably performed within an appropriately programmed computer that receives data samples (e.g., of the form $(x_i, b_i)$ as described hereinabove). Moreover, such data samples may be obtained from various types instruments and for various types of applications such as:

(3.1) Mass spectrometry;

(3.2) Absorption/Transmission/Emission spectroscopy;

(3.3) Fluorescence Spectroscopy;

(3.4) Raman Spectroscopy;

(3.5) Digital Image enhancement (i.e. de-blurring and de-noising); and/or (3.6) Sound Enhancement.

Note that the applications described here will be more fully described herein below.

The flowchart of FIGS. 20A through 20C will now be described. In step 2004 a determination is made as to what distribution functional form G is appropriate for representing the discrete wave forms into which a composite wave form is to be decomposed. Depending upon the wave form outputting application from which data samples are received, various distribution functional forms G may be used such as Gaussian, Bessel, characteristic (step) functions, and sigmoid. In particular, for the signal processing applications (3.1) through (3.6) described above, the following functional forms G may be used:

(a) Gaussian;

(b) Multivariate Gaussian;

(c) Bessel;

(d) Hat functions;

(e) Wavelets; and/or (f) any function that can be parameterized and made to be in the form of an independent spanning set.

In step 2008, determine the values for the parameters that may affect the decomposition of the composite wave form into its discrete wave forms. In particular, the following values are determined: (a) the domain (D) from which values are input to the wave form outputting application for obtaining corresponding readings, and (b) the sampling frequency (or frequencies) to be used in determining a collection X of input values $x_i \in D$, $1<=i_0<=i<k$ for some integers $i_0$ and k, to input to the wave form outputting application for thereby obtaining corresponding application readings $b_i$. $1<=i_0<=i<=k$. Additionally, note that the resolution (R) of the of the wave form outputting application may be desirable to obtain, since, e.g., resolution is used to determine the entries $(h_i)$ in the matrix A described in the linear programming embodiment hereinabove in that resolution is used in defining the term "a" in the function g(x) of (1.2). Note that steps 2004 and 2008 need not be performed within the computational system that subsequent steps of FIGS. 20A through 20C are performed. In fact, steps 2004 and 2008 may be performed prior to activation of the wave form outputting application and may be determined by empirical tests and/or manually. For example, in performing various mass spectrometry assays the functional form G of step 2004 may be well known, and the parameter values determined in step 2008 may have been previously set in the mass spectrometer.

In step 2012, the present step receives, from the wave form outputting application, a collection B of sample measurements or readings of the composite wave form at sampling frequency (or frequencies) F, wherein B={$b_i$ wherein $b_i$ is a measurement or reading of the composite wave form at $x_i \in X$}. Note that the data received from the wave form outputting application may in the form of data structures representing each of the pairs ($x_i$, $b_i$). Further note that preferably F (or each such frequency) is greater than R. Note, that subsequent steps in FIGS. 20A through 20C assume a correspondence or association between each $b_i$ and $x_i \in X$. Such correspondence may be represented by data structures that are received in the present step; e.g., data structures representing pairs ($x_i$, $b_i$) $x_i \in X$, Note that the order of steps of 2004 through 2012 may not be important in at least some applications of this flowchart.

In step 2016, a collection CNTR of values from X are determined that are expected to be the centers (or another identifiable point) of each of the discrete wave forms to be determined. Note that in many wave form outputting applications (e.g., mass spectrometry), the values of CNTR correspond to extreme measurements or readings $b_i$ the values of CNTR may be determined by various techniques such as the following:

(5.1) numerical differentiation (upwind, downwind, central difference) and finding zeros;

(5.2) second derivative to find where the slope changes from positive to negative; or (5.3) smoothing then choosing maximal values.

In step 2020, for each $x_i$ in CNTR, determine a likely cross-talk support $CTS_i$ of an instantiation $I_i$ of the distribution functional form G having an unknown extreme measurement or reading at $x_i$, wherein $CTS_i$ is represented a series of contiguous values {$x_{j(i)}$ where $M_{1i}<=j(i)<=M_{2i}$ with $i_0<=M_{1i}<=M_{2i}<=k$ and $x_i$ is one of the $x_j$}. with $M_{1i}$ and $M_{2i}$ corresponding to the limits on the range in D for the cross-talk support of $I_i$. Note that in some wave form outputting applications, such as mass spectrometry, the cross-talk support may be different for different $x_i$ since the resolution of a mass spectrometer may vary over D. Note, that this step need not necessarily be performed after step 2016 as indicated in the flowchart of FIGS. 20A through 20C. In fact, step 2020 may be performed earlier, but after step 2004.

In step 2024, for each cross-talk support $CTS_i$, determine for each $x_j$ (of X) in $CTS_i$, $M_{1i}<=j<=M_{2i}$, a corresponding expression which represents at least an approximation of $I_i$ at $x_j$. Note that each of the expressions may be function $h_{ij}(C_i)$, wherein $h_{ij}(C_i)$ corresponds to an approximation of the intensity or amplitude of $I_i$ at $x_j$, and wherein $C_i$ is the unknown intensity/amplitude of $I_i$ at $x_i$. In one embodiment of the present invention, the expressions $h_{ij}(C_i)$ are determined using linear programming techniques, e.g., as described hereinabove in the linear programming examples given.

In step 2028, let AC be the vector $$\left[\sum_{j=i_0}^{k} h_{ij}(C_i)\right], i_0 <= i <= k \text{ where } h_{ij}(C_i) = 0$$

for such terms not otherwise define in step 2024. Now maximize the objective function $$\sum_{j=i_0}^{k} C_i$$

subject to AC<=B, thereby obtaining the vector $C_{MAX}=[c_{(MAX,i)}]$, wherein $c_{(MAX,i)}$ is an approximation of the intensity/amplitude at $x_i$ OF $I_i$. Note that this step may be performed using a linear programming technique such as the simplex method as one skilled in the art will understand. Further note that this step corresponds to performing the maximization operation (2.2).

In step 2032, minimize the objective function $$\sum_{j=i_0}^{k} C_i$$

where $i_0<=i<=k$, again subject to AC>=B as described in step 2028 to obtain the vector $C_{MIN}=[c_{(MIN,i)}]$, wherein $c_{(MIN,i)}$ is an approximation of the intensity or amplitude at $x_i$ of $I_i$. Note that this step may also be performed using a linear programming technique such as the simplex method as one skilled in the art will understand. Further note that this step corresponds to performing the minimization operation (2.1).

In step 2036, a determination is made as to which of various values best represents a measurement/reading that would have been output by the wave form outputting process/application if there are were substantially no noise (e.g., spikes and/or gaps). There are numerous techniques for performing such a determination and such various determinations are within the scope of the present invention. Step 2036 illustrates, at a high level, one such technique for determining an appropriate noise reduced/eliminated output $b_i$ for each center $x_i$ in CNTR. That is, for each $x_i$ in CNTR the following substeps (i) through (iv) following are performed:

(i) replace $b_i$ with $(c_{(MAX,i)}-c_{(MIN,i)})/2$ (or some other appropriately chosen value between (or including) $c_{(MAX,i)}$, and $c_{(MIN,i)}$);

(ii) recompute both $c_{(MAX,i)}$, $c_{(MIN,i)}$ using the replacement value for $b_i$, thereby obtaining values for $nc_{(MAX,i)}$, and $nc_{(MIN,i)}$;

(iii) determine how much each of the new $nc_{(MAX,i)}$, and $nc_{(MIN,i)}$ changed from its corresponding original value, $c_{(MAX,i)}$, and $c_{(MIN,i)}$ respectively. Note, that if the original $b_i$ corresponds to a spike, then the new $b_i$ also corresponds to a spike (albeit a lesser one), and $nc_{(MIN,i)}$ is expected to move closer to the replacement value of $b_i$ provided in substep (i) than $nc_{(MAX,i)}$. Alternatively, if the original $b_i$ corresponds to a gap, then the replacement $b_i$ also corresponds to a gap (albeit a lesser one), and $nc_{(MAX,i)}$ is expected to move closer to the replacement value of $b_i$ provided in substep (i) than $nc_{(MIN,i)}$. Note that there are additional techniques that can be used in this step for determining which of $c_{(MAX,i)}$, and $c_{(MIN,i)}$ provide a more accurate (i.e., less noisy) value than $b_i$. For example, the $nc_{(MAX,i)}$, and $nc_{(MIN,i)}$ farthest from the replacement value for $b_i$ may be indicative of the more accurate one of $c_{(MAX,i)}$, and $c_{(MIN,i)}$;

(iv) determine a new intensity/amplitude $nc_i$ for $I_i$ wherein the new intensity is a function that is dependent upon the result from substep (iii). More particularly, $nc_i$ may be whichever one of the original $c_{(MAX,i)}$, $c_{(MIN,i)}$ whose corresponding new values $nc_{(MAX,i)}$, $nc_{(MIN,i)}$ respectively moved the least toward the replacement value of $b_i$. Alternatively, the new intensity may be a weighted sum of the original $c_{(MAX,i)}$, $c_{(MIN,i)}$ wherein such weights are, e.g., inversely related to the relative changes between $\Delta c_{(MAX,i)}$=ABSOLUTE VALUE OF $[c_{(MAX,i)} - nc_{(MAX,i)}]$, and $\Delta c_{(MIN,i)}$=ABSOLUTE VALUE OF $[c_{(MIN,i)} - nc_{(MIN,i)}]$.

In step 2040, for each instance $I_i$ of a discrete wave form obtained, output data indicative of the instance's center and its corresponding intensity/amplitude for thereby identifying a physical characteristic of the item from which the composite wave form was obtained. Note that subsequently, depending on the use and interpretation supplied to the output data various post processing steps and/or results may be achieved by different embodiments of the present invention. Such post processing steps and/or results are described hereinbelow in the context of different embodiments of the present invention.

Embodiments of the present invention can be used to process signals from various wave form outputting applications. The following descriptions (A) through (C) following further describe such wave form outputting applications to which an embodiment of the present invention can be applied:

(A) Mass Spectroscopy

Figure 21:
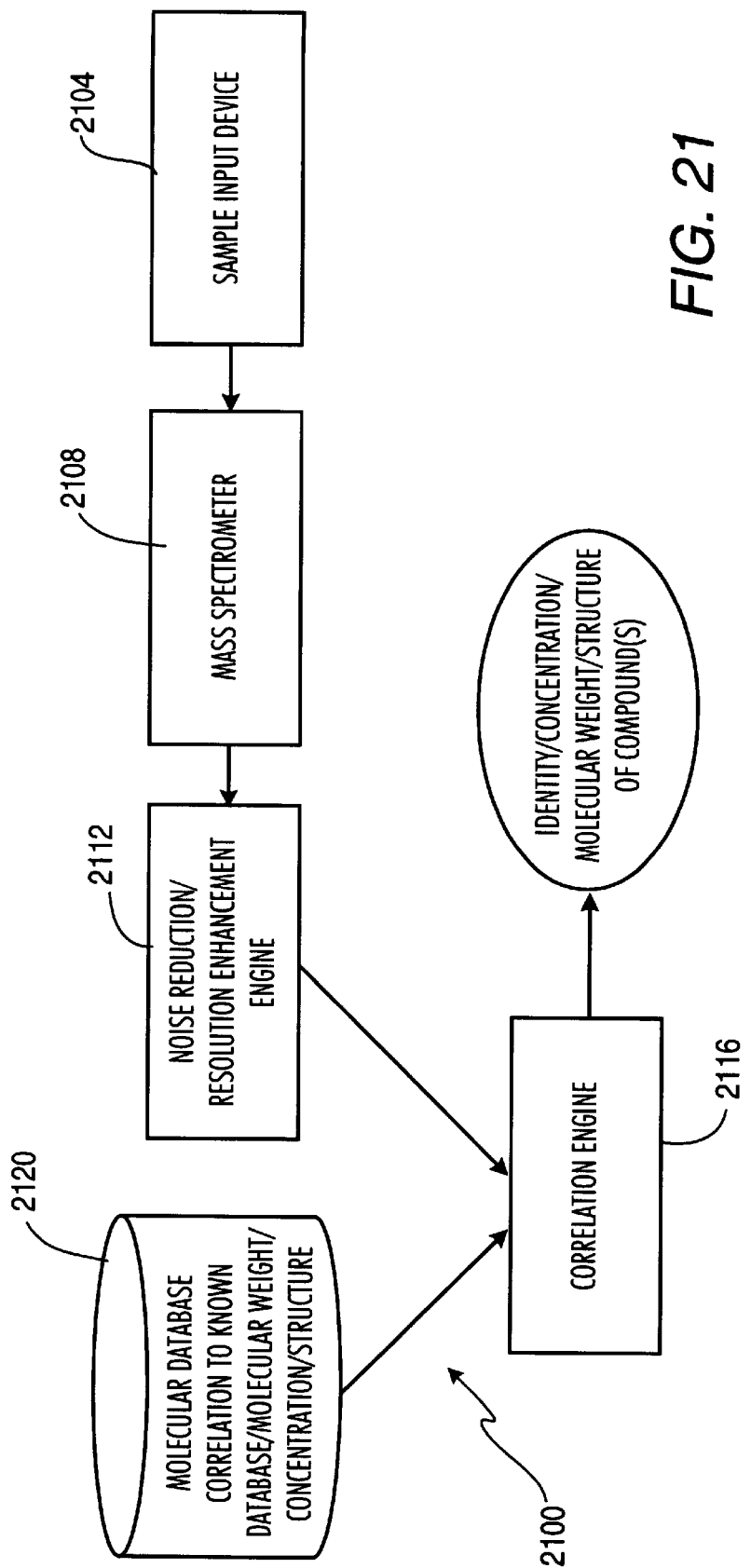
FIG. 21 is a block diagram showing the components of a mass spectrometry system 2100 which is an embodiment of the present invention, wherein the system 2100 reduces the noise and/or enhances the resolution of mass spectrometry data obtained from a sample compound or material.

FIG. 21 is a diagram illustrating the components of a mass spectrometry system 2100 that uses an embodiment of the present invention for determining at least one of: (a) an identity of a compound or material; (b) a concentration or purity of a compound or material; (c) a molecular weight of a compound or material; and (d) a molecular structure of a compound or material. The mass spectrometry system 2100 includes a sample input device 2104 in which a sample of the compound(s) or material(s) to be assayed resides when intensity readings or measurements are being taken by the mass spectrometer 2108, wherein such readings or measurements represent a composite wave form. Note that the sample input device 2104 may only house the sample(s) being assayed momentarily; e.g., a gas or liquid may flow therethrough as the readings are taken by the mass spectrometer 2108. Subsequently, the readings or measurements, together with their corresponding sampling input values in the mass spectrometer sampling range (e.g., the mass to charge ratio range), for the composite wave form are output to the noise reduction/resolution enhancement engine 2112 which is an operative embodiment of the flowchart of FIGS. 20A through 20C. The noise reduction/resolution enhancement engine 2112 can reside in a computer distinct from the mass spectrometer 2108. Moreover, note that the noise reduction/resolution enhancement engine 2112 may utilize the linear programming methods described hereinabove for operationalizing the flowchart of FIGS. 20A through 20C. However, non-linear techniques may also be used to operationalize FIGS. 20A through 20C in the noise reduction/resolution enhancement engine 2112. The output from the noise reduction/resolution enhancement engine 2112 is, e.g., for each discrete wave form obtained from the composite wave form, a center of the discrete wave form and a corresponding intensity/amplitude. This output is supplied to a correlation engine 2116 which performs a correlation or a most likely match/similarity of the engine 2116 output with date for one or more discrete wave forms of known compounds residing in the molecular database 2120. Thus, the correlation engine 2116 outputs a most likely identity, concentration, molecular weight, and/or molecular structure of the assayed sample to at least one of a display and/or a storage device (not shown), wherein the output may be used for further analysis or for presenting to a user. Note that such a correlation engine 2116 may determine the correlation or most likely match/similarity by statistical techniques, hierarchical techniques, and techniques that employ some measure of proximity to a known compound or mixture as one skilled in the art will understand.

(B) Light spectroscopy

Often in light spectroscopy one is attempting to measure discrete light bands that correspond to a mode of the compound that one is attempting to measure. These discrete light bands will appear as peaks that may be Gaussian or Bessel type functions. As in mass spectrometry, the systems that measure these light bands suffer from noise and limited resolution. In particular, absorbance spectroscopy is highly susceptible to noise gap problems while transmission spectroscopy is inherently susceptible to noise spike problems. Resolution is usually determined by the characteristics of the system such as entrance slit width, focal length, quality of the optics, and proper alignment.

One light spectroscopy application for which the present invention is particularly useful is Raman spectroscopy which measures the shifts in a laser light line. The spectra from this type of application often appear as peaks each corresponding to a mode of the sample being assayed.

Another light spectroscopy application for which the present invention is useful is fluorescence spectroscopy, wherein a sample to be assayed is excited with a discrete light source, which the sample absorbs then re-emits the light at lower energy (longer wavelength). The intensity and wavelengths of the emitted light are often characteristic of the substance(s) in the sample and can often be used to determine concentration, identity and even structure of the sample.

In light spectroscopy applications the the present invention can be used to generate more accurate spectra which can be used to correlate with concentration, identification and structure determination.

Figure 22:
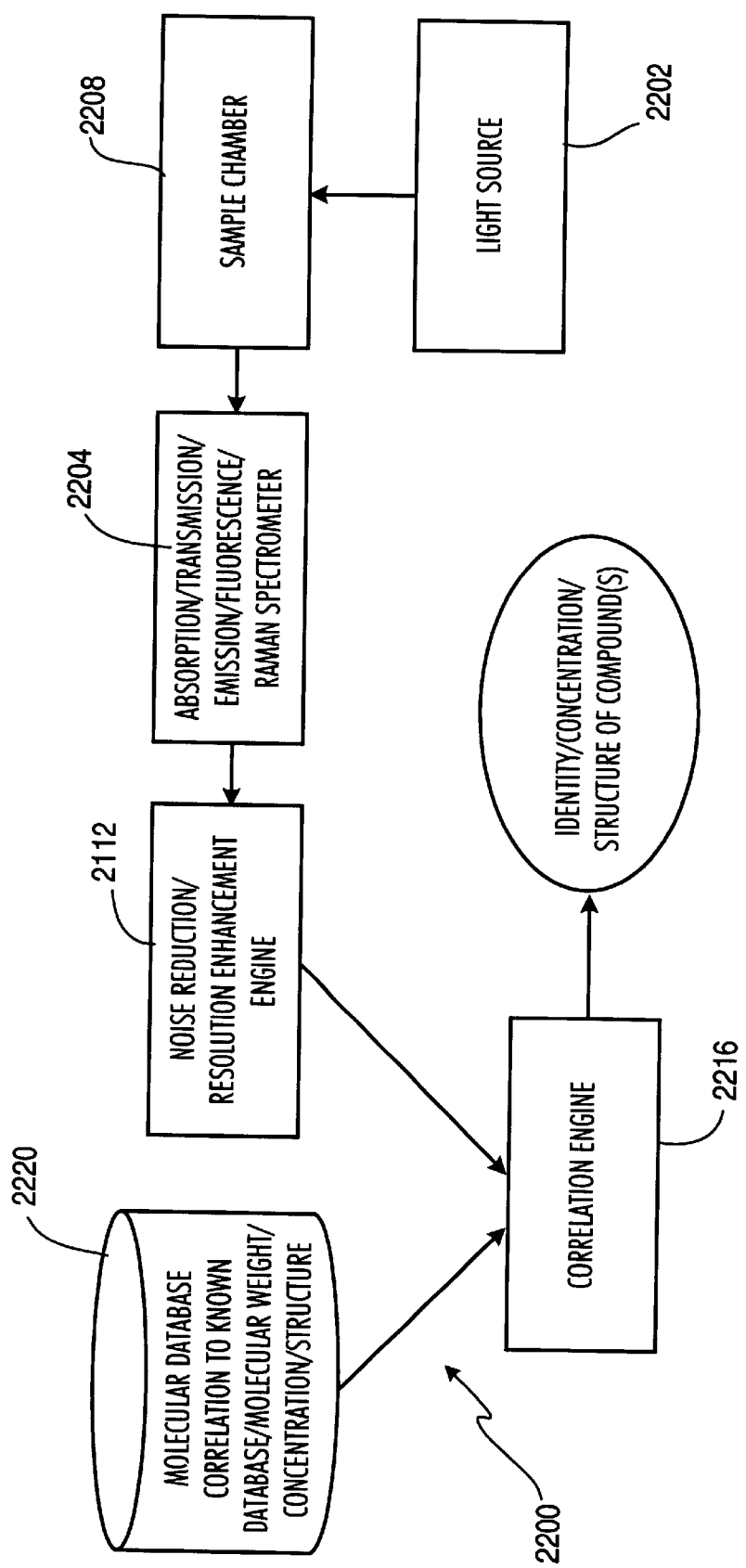
FIG. 22 is a block diagram showing the components of a light spectrometry system 2200 which is an embodiment of the present invention, wherein the system 2200 reduces the noise and/or enhances the resolution of light spectrometry data obtained from light emitted/reflected from a sample compound or material.

FIG. 22 is a diagram illustrating the components of a light spectrometry system 2200 that uses light spectrometer 2204 together with an embodiment of the present invention for determining at least one of: (a) an identity of a compound or material; (b) a concentration or purity of a compound or material; and (c) a molecular structure of a compound or material. The light spectrometry system 2200 includes a light source 2202 for generating light directed toward a sample chamber 2208 in which a sample of the compound(s) or material(s) to be assayed resides when light band readings or measurements are being taken by the light spectrometer 2204, wherein such readings or measurements represent a composite wave form. Subsequently, the readings or measurements, together with their corresponding sampling input values in the light spectrometer sampling range (e.g., the range of light frequencies from which the readings are to be obtained), for the composite wave form are output to the noise reduction/resolution enhancement engine 2212 which is an operative embodiment of the flowchart of FIGS. 20A through 20C. The noise reduction/resolution enhancement engine 2212 can reside in a computer distinct from the light spectrometer 2204. Moreover, note that the noise reduction/resolution enhancement engine 2212 may utilize the linear programming methods described hereinabove for operationalizing the flowchart of FIGS. 20A through 20C. However, non-linear techniques may also be used to operationalize FIGS. 20A through 20C in the noise reduction/resolution enhancement engine 2212. The output from the noise reduction/resolution enhancement engine 2212 is, e.g., for each discrete wave form obtained from the composite wave form, a center of the discrete wave form and a corresponding light band amplitude. This output is supplied to a correlation engine 2216 which performs a correlation or most likely match/similarity of the engine 2212 output with date for one or more discrete wave forms of known compounds residing in the molecular database 2216. Thus, the correlation engine 2216 outputs a most likely identity, concentration, and/or molecular structure of the assayed sample to at least one of a display and/or a storage device (not shown), wherein the output may be used for further analysis or for presenting to a user as one skilled in the art will understand. Note that such a correlation engine 2212 may determine the correlation or most likely match/similarity by statistical techniques, hierarchical techniques, and techniques that employ some measure of proximity to a known compound or mixture as one skilled in the art will understand.

(C) Image enhancement

Often digital images (especially those taken with a digital camera or scanner) suffer from noise and poor focus. The result is an image that has stray noise and a blurred appearance. A technique that could mitigate noise and de-blur an image would be very desirable since it would improve the quality of digital images and could render otherwise unusable images as useable. Often poor focus has the effect of a Gaussian blur which affects the clarity of the image. To obtain a matrix of intensity values that represents such an image, the same linearization techniques as described hereinabove for the present invention can be applied so that the constraint matrix A has as many rows as there are pixels, and where the $\bar{b}$ vector is the original image as one skilled in the art will understand.

Figure 23:
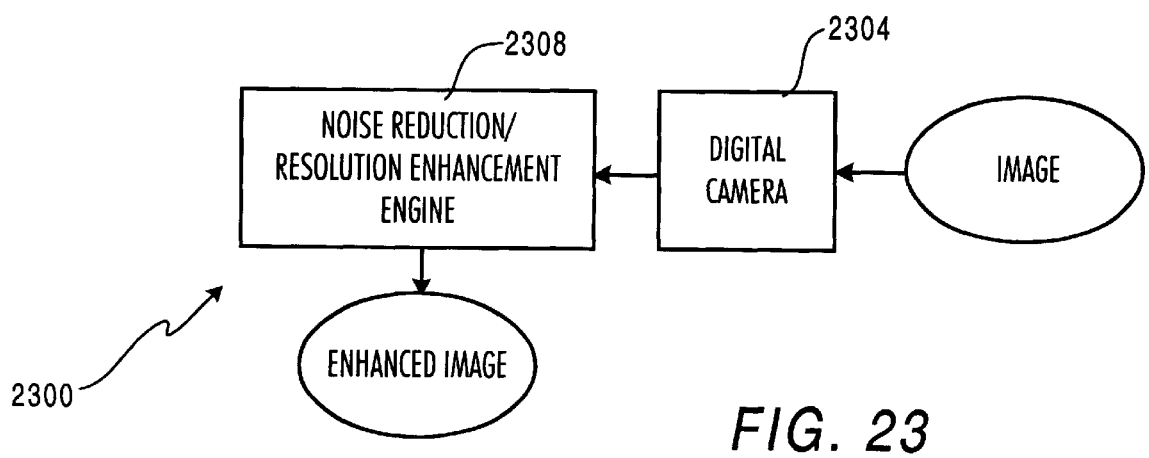
FIG. 23 is a block diagram showing the components of an image enhancement system 2300 which is an embodiment of the present invention, wherein the system 2300 reduces the noise and/or enhances the resolution of image data obtained from a digital camera 2304.

FIG. 23 is a diagram illustrating the components of an image enhancement system 2300 that uses a digital camera 2304 together with an embodiment of the present invention for enhancing digital images output by the digital camera In particular, this embodiment of the present invention includes a noise reduction/resolution enhancement engine 2308 that can reside in a computer distinct from the digital camera 2304. Moreover, note that the noise reduction/resolution enhancement engine 2308 may utilize the linear programming methods described hereinabove for operationalizing the flowchart of FIGS. 20A through 20C. However, non-linear techniques may also be used to operationalize FIGS. 20A through 20C in the noise reduction/resolution enhancement engine 2308. The noise reduction/resolution enhancement engine 2308 receives, for each pixel of the image output by the digital camera 2304, color data. Such color data can be noise reduced (e.g., deblurred) at each pixel by, e.g., considering the color data as a composite wave form and decomposing the composite wave form to obtain the primary (i.e., highest amplitude) color(s) for the pixel, and subsequently the combination of these primary colors with their amplitudes as the enhanced color of the pixel that is output to at least one of a display and/or a storage device (not shown), wherein the output may be used for further analysis or for presenting to a user.

(D) Sound enhancement

Sound that has been digitized often suffers from noise. An technique that reduces this noise can make the sound more appealing and/or succinct. Sound data can be stored in several ways. In a pure form, it is a composite of many frequencies that are summed together to give a composite waveform of amplitudes. This waveform is sampled at some rate, and can often have noise introduced into this sampling. An embodiment of the present invention can be used to "fit" sine and cosine waves of varying frequency to recreate the waveform with less noise. To accomplish this a window of allowable frequencies and the number of distinct frequencies allowed is determined prior to decomposing composite wave forms representing the sound.

Figure 24:
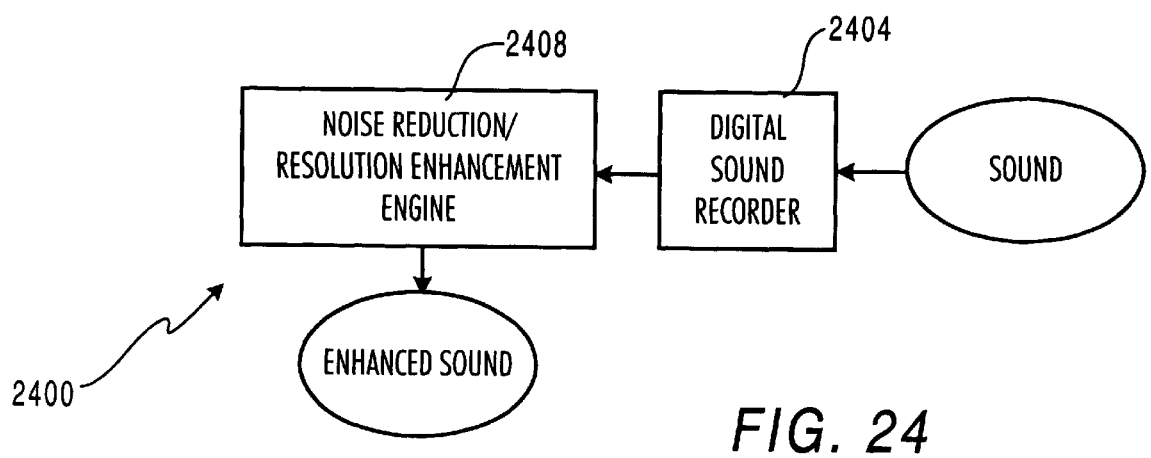
FIG. 24 is a block diagram showing the components of an audio enhancement system 2400 which is an embodiment of the present invention, wherein the system 2400 reduces the noise and/or enhances the resolution of audio data obtained from a digital sound recorder 2404.

FIG. 24 is a diagram illustrating the components of an sound enhancement system 2400 that uses a digital recorder 2404 together with an embodiment of the present invention for enhancing digital audio data output by the digital recorder In particular, this embodiment of the present invention includes a noise reduction/resolution enhancement engine 2408 that can reside in a computer distinct from the digital recorder 2404. Moreover, note that the noise reduction/resolution enhancement engine 2408 may utilize the linear programming methods described hereinabove for operationalizing the flowchart of FIGS. 20A through 20C. However, non-linear techniques may also be used to operationalize FIGS. 20A through 20C in the noise reduction/resolution enhancement engine 2408. The noise reduction/resolution enhancement engine 2408 receives a plurality of audio segments (each having a plurality of digital audio data packets) output by the digital recorder 2404. Each such audio packet can be noise reduced by e.g., considering the audio data in the packet as a composite wave form and decomposing the composite wave form to obtain the primary (i.e., highest amplitude) one or more audio frequencies for the packet, and subsequently the combination of these primary audio frequencies with their amplitudes as the enhanced audio packet data that is output to at least one of a display, and/or a storage device (not shown), wherein the output may be used for further analysis or for presenting to a user.

It is important to note that each of the noise reduction/resolution enhancement engines 2112, 2212, 2308 and 2408 may be accessed through a communications network such as the Internet. Thus, the data samples input to these engines (by e.g., the mass spectrometer 108, the light spectrometer 2204, the digital camera 2304 or the digital sound recorder 2404) may be received through such a communications network, and the outputs obtained from the noise reduction/resolution enhancement engines (or results derived from such outputs, e.g., via correlation engines 2116 or 2216) can be transmitted back to the source of the original data samples.

While various embodiments of the present invention have been described in detail, it is apparent that further modifications and adaptations of the invention will occur to those skilled in the art. However, it is to be expressly understood that such modifications and adaptations are within the spirit and scope of the present invention.

APPENDIX
$$f[x\_, n\_, a\_] := e^{\frac{-(x-n)^2}{a^2}};$$
width = .7;
$$res = \frac{width}{2\sqrt{-Log[\frac{1}{2}]}};$$
coeff =
 Table[n, {n, 2, 4}];
peak[x_] :=
 Sum[coeff[[n - 1]]
    f[x, n, res],
   {n, 2, 4}];
Plot[{2 f[x, 2, res],
   3 f[x, 3, res],
   4 f[x, 4, res], peak[x]},
  {x, 1, 5},
  PlotRange → All,
  Axes → False]
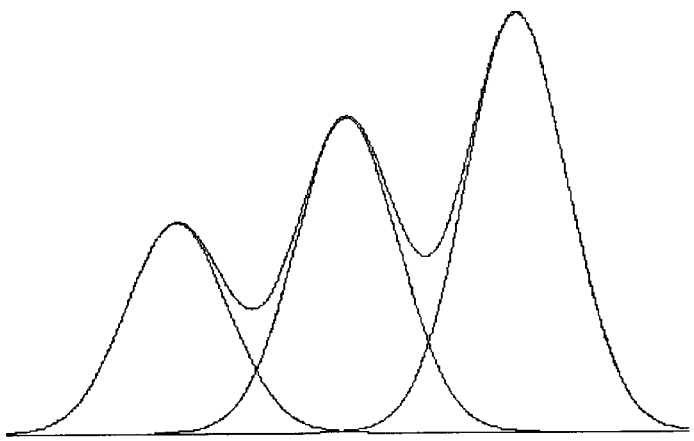
37

```
- Graphics -
<< Graphics`FilledPlot`
testdata1 =
 Table[
  {z, peak[z] +
    Random[Real,
     {-0.1 peak[z],
      0.1 peak[z]}]},
  {z, 1, 5, .1}];
testdata2 =
 Table[peak[z],
  {z, 1, 5, .1}];
FilledListPlot[testdata1]
```
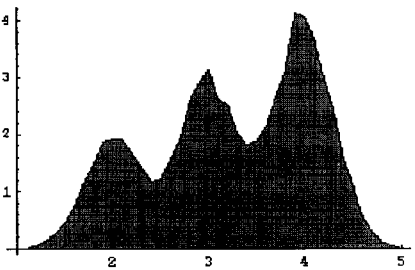
```
- Graphics -
ConstrainedMax[peak[
```

```
MakeMMatrix[masses_, fwhm_] := {
    g[x_, width_] := e^(-x^2 / (width / (2 Sqrt[Log[2]]))^2) ;
    c1 = 1;
    c2 = g[0.5, fwhm];
    c3 = g[1, fwhm];
    SetZero[x_, y_] := 0;
    A = Table[SetZero[i, j], {i, 1, 5 + 2 (masses - 1)},
        {j, 1, 5 + 2 (masses - 1)}];
    For[i = 3, i < 4 + 2 (masses - 1), i++,
      For[j = 3, j < 4 + 2 (masses - 1), j++,
        If[OddQ[i],
          If[i == j,
            A[[i, j]] = c1;
            A[[i - 1, j]] = c2;
            A[[i + 1, j]] = c2;
            A[[i - 2, j]] = c3;
            A[[i + 2, j]] = c3;]]]]
}
MakeCoeff[masses_] := {
    SetOne[x_] := 1;
    Coeffvector =
    Table[SetOne[i],
        {i, 1, 5 + 2 (masses - 1)}];
}
```

```
MakeBVector[masses_, fwhm_] := { f[x_, n_, a_] := e^(-(x-n)^2/a^2);
    width = fwhm;
    res = width / (2 sqrt(-Log[1/2]));

coeff = Table[n, {n, 2, 4}];
    (*coeff[[2]]=100;*)
    peak[x_] := Sum[coeff[[n-1]] f[x, n, res],
        {n, 2, 4}];

B =
        Table[
            Abs[peak[z] +
                Random[Real, {-0.05 peak[z],
                    0.05 peak[z]}]], {z, 1, 5, 0.5}];
    B2 = Table[{(n+1)/2, B[[n]]}, {n, 1, 9}];
}
width = .7;
MakeAMatrix[3, width];
MakeCoeff[3];
MakeBVector[3, width];
B[[7]] -= 0;
B2[[7]] = {4, B[[7]]};
ans = LinearProgramming[Coeffvector, A, B];
coeffs2 = {0, 0, 1, 0, 1, 0, 1, 0, 0};
ans1 = LinearProgramming[-coeffs2, -A, -(B)]
MatrixForm[ans1] MatrixForm[ans]
 MatrixForm[N[B]]
{0, 0, 1.91854, 0, 2.87095, 0, 3.88195, 0, 0}
```

$$\begin{pmatrix} 0 \\ 0 \\ 1.91854 \\ 0 \\ 2.87095 \\ 0 \\ 3.88195 \\ 0 \\ 0 \end{pmatrix} \begin{pmatrix} 0 \\ 0 \\ 2.08865 \\ 0 \\ 2.87978 \\ 0 \\ 4.13632 \\ 0 \\ 0 \end{pmatrix} \begin{pmatrix} 0.00669241 \\ 0.486383 \\ 2.0987 \\ 1.16397 \\ 2.90149 \\ 1.69913 \\ 3.89197 \\ 1.00523 \\ 0.0142376 \end{pmatrix}$$

```
<<Graphics`Graphics`
DisplayTogether[
 ListPlot[B2,
  PlotStyle -> {PointSize[.03]}],
 Plot[ans[[3]]*f[x, 2, res], {x, 1, 5},
  PlotStyle -> {Hue[0], Dashing[{.01, .01}],
     Thickness[.003]}],
 Plot[ans[[5]]*f[x, 3, res], {x, 1, 5},
  PlotStyle -> {Hue[0], Dashing[{.01, .01}],
     Thickness[.003]}],
 Plot[ans[[7]]*f[x, 4, res], {x, 1, 5},
  PlotStyle -> {Hue[0], Dashing[{.01, .01}],
     Thickness[.003]}],
 Plot[ans1[[3]]*f[x, 2, res], {x, 1, 5},
  PlotStyle -> {Hue[.7], Dashing[{.01, .01}],
     Thickness[.003]}],
 Plot[ans1[[5]]*f[x, 3, res], {x, 1, 5},
  PlotStyle -> {Hue[.7], Dashing[{.01, .01}],
     Thickness[.003]}],
 Plot[ans1[[7]]*f[x, 4, res], {x, 1, 5},
  PlotStyle -> {Hue[.7], Dashing[{.01, .01}],
     Thickness[.003]}],
 Plot[ans[[3]]*f[x, 2, res] +
    ans[[5]]*f[x, 3, res] +
    ans[[7]]*f[x, 4, res], {x, 1, 5},
  PlotStyle -> {Hue[0], Thickness[.005]}],
 Plot[ans1[[3]]*f[x, 2, res] +
    ans1[[5]]*f[x, 3, res] +
    ans1[[7]]*f[x, 4, res], {x, 1, 5},
  PlotStyle -> {Hue[.7], Thickness[.005]}],
 PlotRange -> All,
 AxesLabel -> {AMU, Intensity}]
```

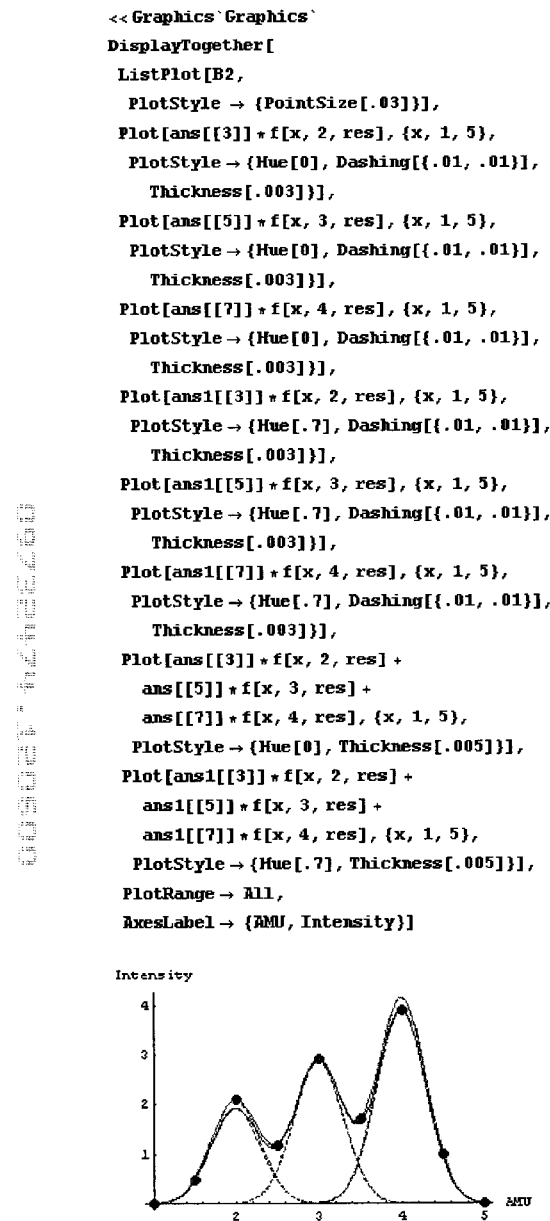

FIG. 41

```
- Graphics -
MatrixForm[A]
Coeffvector
⎛ 0  0  0.00348829  0        0        0        0         0  ⎞
⎜ 0  0  0.243026    0        0        0        0         0  ⎟
⎜ 0  0  1           0  0.00348829     0        0         0  ⎟
⎜ 0  0  0.243026    0   0.243026      0        0         0  ⎟
⎜ 0  0  0.00348829  0        1        0  0.00348829      0  ⎟
⎜ 0  0     0        0   0.243026      0   0.243026       0  ⎟
⎜ 0  0     0        0  0.00348829     0        1         0  ⎟
⎜ 0  0     0        0        0        0   0.243026       0  ⎟
⎝ 0  0     0        0        0        0  0.00348829      0  ⎠
{1, 1, 1, 1, 1, 1, 1, 1, 1}
coeffs2 = {0, 0, 1, 0, 1, 0, 1, 0, 0};
ans1 = LinearProgramming[-coeffs2, -A, -(B)]
{0, 0, 2.00452, 0, 2.80055, 0, 3.94353, 0, 0}
<< Graphics`MultipleListPlot`
MultipleListPlot[B + 10, B,
  PlotJoined → True]
```

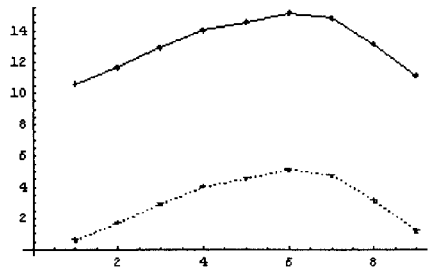

```
- Graphics -
width = .7;
MakeAMatrix[3, width];
MakeCoeff[3];
MakeBVector[3, width];
B[[7]] += 15;
B2[[7]] = {4, B[[7]]};
ans = LinearProgramming[Coeffvector, A, B];
coeffs2 = {0, 0, 1, 0, 1, 0, 1, 0, 0};
ans1 = LinearProgramming[-coeffs2, -A, -(B)]
MatrixForm[ans1] MatrixForm[ans]
 MatrixForm[N[B]]
{0, 0, 1.91, 0, 2.98326, 0, 3.81397, 0, 0}
```

$$\begin{pmatrix} 0 \\ 0 \\ 1.91 \\ 0 \\ 2.98326 \\ 0 \\ 3.81397 \\ 0 \\ 0 \end{pmatrix} \begin{pmatrix} 0 \\ 0 \\ 2.09876 \\ 0 \\ 2.92908 \\ 0 \\ 19.1583 \\ 0 \\ 0 \end{pmatrix} \begin{pmatrix} 0.00666263 \\ 0.507702 \\ 2.10898 \\ 1.21356 \\ 3.00323 \\ 1.6908 \\ 19.1685 \\ 0.926894 \\ 0.0133816 \end{pmatrix}$$

```
<<Graphics`Graphics`
DisplayTogether[
 ListPlot[B2,
  PlotStyle -> {PointSize[.02]}],
 Plot[(ans[[3]] + ans1[[3]]) / 2 * f[x, 2, res],
  {x, 1, 5}],
 Plot[(ans[[5]] + ans1[[5]]) / 2 * f[x, 3, res],
  {x, 1, 5}],
 Plot[(ans[[7]] + ans1[[7]]) / 2 * f[x, 4, res],
  {x, 1, 5}],
 Plot[ans[[3]] * f[x, 2, res] +
   ans[[5]] * f[x, 3, res] +
   ans[[7]] * f[x, 4, res], {x, 1, 5},
  PlotStyle -> Hue[0]],
 Plot[ans1[[3]] * f[x, 2, res] +
   ans1[[5]] * f[x, 3, res] +
   ans1[[7]] * f[x, 4, res], {x, 1, 5},
  PlotStyle -> Hue[.7]],
 PlotRange -> All]
```

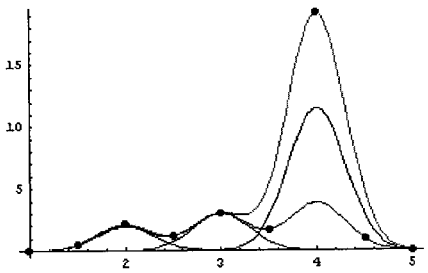

- Graphics -

```
s = 2;
w =
 Table[
  {z,
   Abs[g[z, s] +
     Random[Real, {-0.05 g[z, s],
       0.05 g[z, s]}]]}, {z, -3, 3, 0.05}];
w[[75]] = {0.7, 0.15}
w2 =
 Table[
  {z,
   Abs[g[z, s] +
     Random[Real, {-0.05 g[z, s],
       0.05 g[z, s]}]]}, {z, -3, 3, 0.05}];
w2[[75]] = {0.7, 1.5}
{0.7, 0.15}
{0.7, 1.5}

<< Graphics`FilledPlot`
DisplayTogether[
 FilledListPlot[w, Fills -> {GrayLevel[.9]},
  Axes -> False, PlotRange -> {0, 2.2}],
 Plot[1.06 g[z, s], {z, -3, 3},
  PlotStyle -> {Hue[0], Thickness[.006]},
  Axes -> False],
 Plot[.2 g[z, s], {z, -3, 3},
  PlotStyle -> {Hue[.6], Thickness[.006]},
  Axes -> False]
]

DisplayTogether[
 FilledListPlot[w2, Fills -> {GrayLevel[.9]},
  Axes -> False, PlotRange -> {0, 2.2}],
 Plot[.95 g[z, s], {z, -3, 3},
  PlotStyle -> {Hue[.6], Thickness[.006]},
  Axes -> False],
 Plot[2.1 g[z, s], {z, -3, 3},
  PlotStyle -> {Hue[0], Thickness[.006]},
  Axes -> False]
]
```

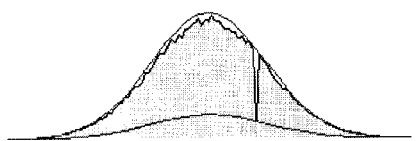
- Graphics -
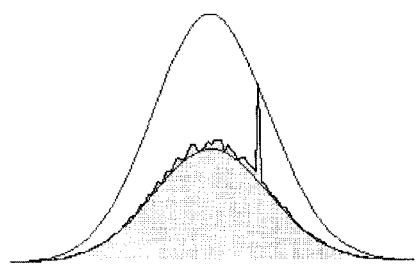
- Graphics -
Plot[g[x, 2], {x, -3, 3}]
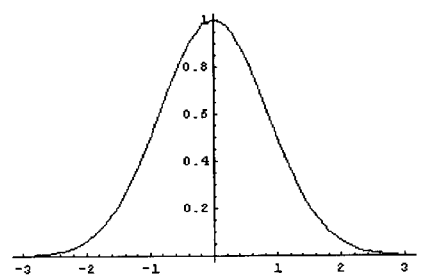
- Graphics -

```
MakeAMatrix[masses_, fwhm_] := { g[x_, width_] := e^(-x^2/(width/(2 Sqrt[Log[2]]))^2) ;
    c1 = 1;
    c2 = g[0.5, fwhm];
    c3 = g[1, fwhm];
    c4 = g[1.5, fwhm];
    c5 = g[2, fwhm];
    c6 = g[2.5, fwhm];
    c7 = g[3, fwhm];
    SetZero[x_, y_] := 0;
    A = Table[SetZero[i, j], {i, 1, 5 + 2 (masses - 1)},
      {j, 1, 5 + 2 (masses - 1)}];
    For[i = 3, i < 4 + 2 (masses - 1), i++,
     For[j = 3, j < 4 + 2 (masses - 1), j++,
      If[OddQ[i],
       If[i == j,
        A[[i, j]] = c1;
        A[[i - 1, j]] = c2;
        A[[i + 1, j]] = c2;
        A[[i - 2, j]] = c3;
        A[[i + 2, j]] = c3;

If[i + 3 ≤ 5 + 2 (masses - 1),
         A[[i + 3, j]] = c4;];
        If[i - 3 > 0,
         A[[i - 3, j]] = c4;];

If[i + 4 ≤ 5 + 2 (masses - 1),
         A[[i + 4, j]] = c5;];
        If[i - 4 > 0,
         A[[i - 4, j]] = c5;];

If[i + 5 ≤ 5 + 2 (masses - 1),
         A[[i + 5, j]] = c6;];
        If[i - 5 > 0,
         A[[i - 5, j]] = c6;];

If[i + 6 ≤ 5 + 2 (masses - 1),
         A[[i + 6, j]] = c7;];
        If[i - 6 > 0,
         A[[i - 6, j]] = c7;];
       ]]]
}
```

```
MakeCoeff[masses_] := {
  SetOne[x_] := 1;
  Coeffvector =
    Table[SetOne[i],
      {i, 1, 5 + 2 (masses - 1)}];
  }
MakeBVector[masses_, fwhm_] := {
  f[x_, n_, a_] := e^(-(x-n)^2/a^2) ;
  width = fwhm;
  res = width / (2 sqrt(-Log[1/2]));
  coeff = Table[n, {n, 2, 4}];
  coeff[[2]] = 100;
  peak[x_] := Sum[coeff[[n-1]] f[x, n, res],
    {n, 2, 4}];

B =
    Table[
      Abs[peak[z] +
        Random[Real, {-0.05 peak[z],
          0.05 peak[z]}]], {z, 1, 5, 0.5}];
  B2 = Table[{(n+1)/2, B[[n]]}, {n, 1, 9}];
  }
width = .7;
MakeAMatrix[3, width];
MakeCoeff[3];
MakeBVector[3, width];
B[[8]] += 0;
B2[[8]] = {4.5, B[[8]]};
ans = LinearProgramming[Coeffvector, A, B];
coeffs2 = {0, 0, 1, 0, 1, 0, 1, 0, 0};
ans1 = LinearProgramming[-coeffs2, -A, -(B)]
MatrixForm[ans1] MatrixForm[ans]
  MatrixForm[N[B]]
{0, 0, 1.92459, 0, 96.213, 0, 3.8075, 0, 0}
```

$$\begin{pmatrix} 0 \\ 0 \\ 1.92459 \\ 0 \\ 96.213 \\ 0 \\ 3.8075 \\ 0 \\ 0 \end{pmatrix} \begin{pmatrix} 0 \\ 0 \\ 2.09355 \\ 0 \\ 97.8926 \\ 0 \\ 4.19531 \\ 0 \\ 0 \end{pmatrix} \begin{pmatrix} 0.00730292 \\ 0.480711 \\ 2.26021 \\ 24.2993 \\ 96.233 \\ 24.7504 \\ 4.51691 \\ 1.01986 \\ 0.0132817 \end{pmatrix}$$

```
<<Graphics`Graphics`
DisplayTogether[
 ListPlot[B2,
  PlotStyle → {PointSize[.03]}],
 ListPlot[B2, PlotJoined → True],
 (*Plot[ans[[3]]*f[x,2,res],{x,1,5},
   PlotStyle→{Hue[0],Dashing[{.01,.01}],
     Thickness[.003]}],
  Plot[ans[[5]]*f[x,3,res],{x,1,5},
   PlotStyle→{Hue[0],Dashing[{.01,.01}],
     Thickness[.003]}],
  Plot[ans[[7]]*f[x,4,res],{x,1,5},
   PlotStyle→{Hue[0],Dashing[{.01,.01}],
     Thickness[.003]}],
  Plot[ans1[[3]]*f[x,2,res],{x,1,5},
   PlotStyle→{Hue[.7],Dashing[{.01,.01}],
     Thickness[.003]}],
  Plot[ans1[[5]]*f[x,3,res],{x,1,5},
   PlotStyle→{Hue[.7],Dashing[{.01,.01}],
     Thickness[.003]}],
  Plot[ans1[[7]]*f[x,4,res],{x,1,5},
   PlotStyle→{Hue[.7],Dashing[{.01,.01}],
     Thickness[.003]}],
  Plot[ans[[3]]*f[x,2,res]+
    ans[[5]]*f[x,3,res]+
    ans[[7]]*f[x,4,res],{x,1,5},
   PlotStyle→{Hue[0],Thickness[.005]}],
  Plot[ans1[[3]]*f[x,2,res]+
    ans1[[5]]*f[x,3,res]+
    ans1[[7]]*f[x,4,res],{x,1,5},
   PlotStyle→{Hue[.7],Thickness[.005]}],*)
 PlotRange → {0, 5},
 AxesLabel → {AMU, Intensity}]
```

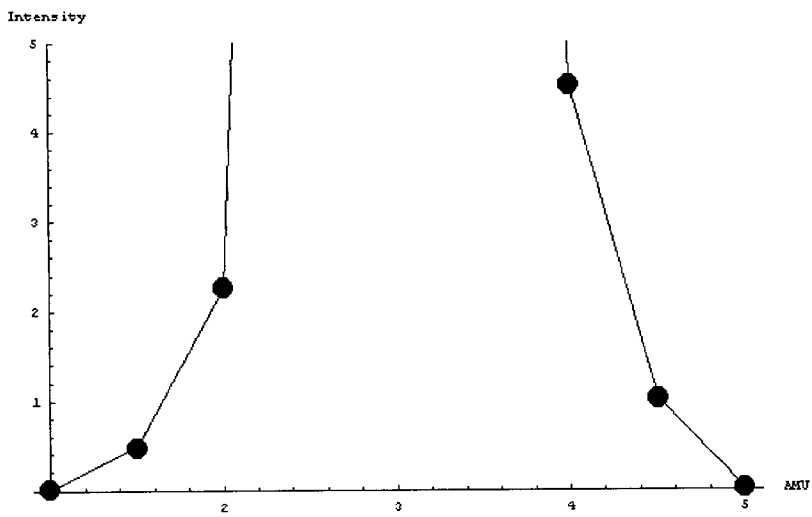
```
- Graphics -
MatrixForm[A]
Coeffvector
⎛ 0  0   0.291632      0  0.0072334  0  0.0000152588
  0  0   0.734867      0  0.0625     0  0.000452087
  0  0   1             0  0.291632   0  0.0072334
  0  0   0.734867      0  0.734867   0  0.0625
  0  0   0.291632      0  1          0  0.291632
  0  0   0.0625        0  0.734867   0  0.734867
  0  0   0.0072334     0  0.291632   0  1
  0  0   0.000452087   0  0.0625     0  0.734867
⎝ 0  0   0.0000152588  0  0.0072334  0  0.291632
{1, 1, 1, 1, 1, 1, 1, 1, 1}
coeffs2 = {0, 0, 1, 0, 1, 0, 1, 0, 0};
ans1 = LinearProgramming[-coeffs2, -A, -(B)]
{0, 0, 2.00452, 0, 2.80055, 0, 3.94353, 0, 0}
<< Graphics`MultipleListPlot`
MultipleListPlot[B + 10, B,
 PlotJoined → True]
```

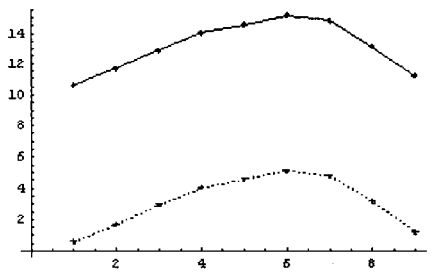
```
- Graphics -
width = .7;
MakeAMatrix[3, width];
MakeCoeff[3];
MakeBVector[3, width];
B[[7]] += 15;
B2[[7]] = {4, B[[7]]};
ans = LinearProgramming[Coeffvector, A, B];
coeffs2 = {0, 0, 1, 0, 1, 0, 1, 0, 0};
ans1 = LinearProgramming[-coeffs2, -A, -(B)]
MatrixForm[ans1] MatrixForm[ans]
 MatrixForm[N[B]]
{0, 0, 1.91, 0, 2.98326, 0, 3.81397, 0, 0}
```
$$\begin{pmatrix} 0 \\ 0 \\ 1.91 \\ 0 \\ 2.98326 \\ 0 \\ 3.81397 \\ 0 \\ 0 \end{pmatrix} \begin{pmatrix} 0 \\ 0 \\ 2.09876 \\ 0 \\ 2.92908 \\ 0 \\ 19.1583 \\ 0 \\ 0 \end{pmatrix} \begin{pmatrix} 0.00666263 \\ 0.507702 \\ 2.10898 \\ 1.21356 \\ 3.00323 \\ 1.6908 \\ 19.1685 \\ 0.926894 \\ 0.0133816 \end{pmatrix}$$

```
<<Graphics`Graphics`
DisplayTogether[
 ListPlot[B2,
  PlotStyle -> {PointSize[.02]}],
 Plot[(ans[[3]] + ans1[[3]]) / 2 * f[x, 2, res],
  {x, 1, 5}],
 Plot[(ans[[5]] + ans1[[5]]) / 2 * f[x, 3, res],
  {x, 1, 5}],
 Plot[(ans[[7]] + ans1[[7]]) / 2 * f[x, 4, res],
  {x, 1, 5}],
 Plot[ans[[3]] * f[x, 2, res] +
   ans[[5]] * f[x, 3, res] +
   ans[[7]] * f[x, 4, res], {x, 1, 5},
  PlotStyle -> Hue[0]],
 Plot[ans1[[3]] * f[x, 2, res] +
   ans1[[5]] * f[x, 3, res] +
   ans1[[7]] * f[x, 4, res], {x, 1, 5},
  PlotStyle -> Hue[.7]],
 PlotRange -> All]
```
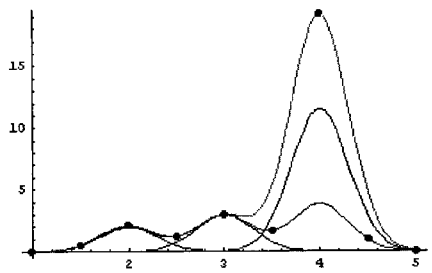
- Graphics -

```
s = 2;
w =
 Table[
  {z,
   Abs[g[z, s] +
    Random[Real, {-0.05 g[z, s],
     0.05 g[z, s]}]]}, {z, -3, 3, 0.05}];
w[[75]] = {0.7, 0.15}
w2 =
 Table[
  {z,
   Abs[g[z, s] +
    Random[Real, {-0.05 g[z, s],
     0.05 g[z, s]}]]}, {z, -3, 3, 0.05}];
w2[[75]] = {0.7, 1.5}
{0.7, 0.15}
{0.7, 1.5}

<< Graphics`FilledPlot`
DisplayTogether[
 FilledListPlot[w, Fills -> {GrayLevel[.9]},
  Axes -> False, PlotRange -> {0, 2.2}],
 Plot[1.06 g[z, s], {z, -3, 3},
  PlotStyle -> {Hue[0], Thickness[.006]},
  Axes -> False],
 Plot[.2 g[z, s], {z, -3, 3},
  PlotStyle -> {Hue[.6], Thickness[.006]},
  Axes -> False]
]

DisplayTogether[
 FilledListPlot[w2, Fills -> {GrayLevel[.9]},
  Axes -> False, PlotRange -> {0, 2.2}],
 Plot[.95 g[z, s], {z, -3, 3},
  PlotStyle -> {Hue[.6], Thickness[.006]},
  Axes -> False],
 Plot[2.1 g[z, s], {z, -3, 3},
  PlotStyle -> {Hue[0], Thickness[.006]},
  Axes -> False]
]
```

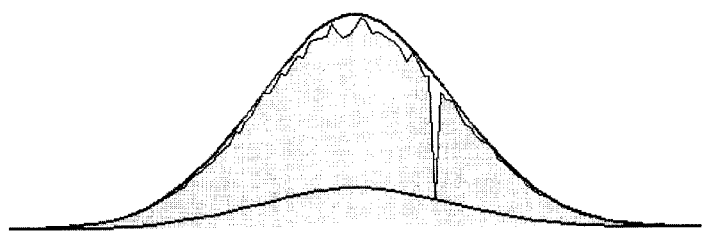
- Graphics -
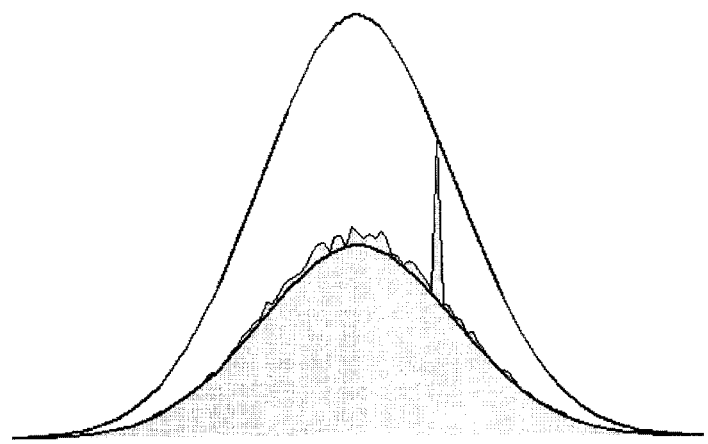
- Graphics -
Plot[g[x, 2], {x, -3, 3}]

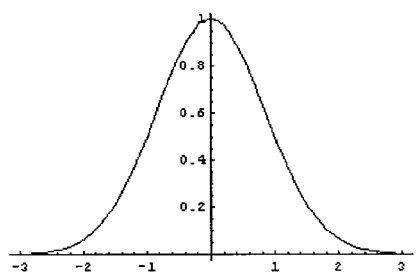
- Graphics -

What is claimed is:

1. A signal processing method for obtaining data indicative of a plurality of discrete wave forms obtained from a composite wave form, wherein the composite wave form is obtained from a wave form outputting process A, comprising:

first determining a discrete wave form wherein a functional combination, f(x) of a plurality of instances of the discrete wave form approximates the composite wave form when x varies over a predetermined range;

receiving, for each sample input x of a collection X having a plurality of sample inputs to the wave form outputting process $\mathcal{A}$ corresponding signal amplitude data, $b_x$, output from the wave form outputting application $\mathcal{A}$ wherein a collection of pairs $(x, b_x)$, x in X is indicative of the composite wave form;

second determining, for each instance, I, of the discrete wave form instances, a portion, p, of a range of one or more of the sample inputs, wherein the portion p corresponds to a instantiation in I of a predetermined portion of the of the discrete wave form, and wherein p includes at least one of the sample inputs x whose corresponding signal amplitude data, $b_x$, is substantially an extreme amplitude for I;

first obtaining a solution for minimizing a functional $\sigma$ that is dependent on a plurality of unknown reduced noise amplitudes $c_p$, where there is one of the $c_p$ for at least one corresponding value $x_p$ from each of the portions p, wherein $\sigma$ monotonically increases with increases in a value for each $c_p$ when the value for $c_p$ is in a range substantially bounded by the set $\{b_x, x \text{ in } X\}$, wherein said minimizing is subject to the constraint: $f(x) \geq b_x$ for x in X, wherein said solution includes an amplitude value $c_{p,MIN}$ for each said $c_p$;

second obtaining a solution for maximizing said functional $\sigma$, wherein said maximizing is subject to the constraint: $f(x) \leq b_x$ for x in X, wherein said solution includes an amplitude $c_{p,MAX}$ for each said $c_p$;

identifying, for each said $c_p$, which of said $c_{p,MIN}$ and said $c_{p,MAX}$ has a lesser amount of noise;

associating, for each said $c_p$, the corresponding value $x_p$ and an amplitude value $nc_p$, wherein $c_{p,MAX} <= nc_p <= c_{p,MIN}$, and $nc_p$ is at least as close to said one of said $c_{p,MIN}$ and said $c_{p,MAX}$ identified in said identifying step as to the other of said $c_{p,MIN}$ and said $c_{p,MAX}$;

comparing (A1) and (A2) following for determining a similarity therebetween:

(A1) a resulting collection of associations of $nc_p$ and $x_p$, and (A2) a predetermined collection C of associations, each said association of C including an amplitude and a corresponding value of the predetermined range;

outputting a result indicative of one of (B1) through (B4) following, wherein said result is dependent upon a similarity determined in said step of comparing:

(B1) a purity of a substance assayed by the wave form outputting process $\mathcal{A}$;

(B2) an identity of a substance assayed by the wave form outputting process $\mathcal{A}$;

(B3) an amount of a substance assayed by the wave form outputting process $\mathcal{A}$; and (B4) a structure of a substance assayed by the wave form outputting process $\mathcal{A}$.

2. The method of claim 1, wherein said step of outputting includes outputting the purity of the substance assayed by the wave form outputting application $\mathcal{A}$.

3. The method of claim 1, wherein said step of outputting includes outputting the identity of the substance assayed by the wave form outputting application $\mathcal{A}$.

4. The method of claim 1, wherein said step of outputting includes outputting the amount of the substance assayed by the wave form outputting application $\mathcal{A}$.

5. The method of claim 1, wherein said step of outputting includes outputting the structure of the substance assayed by the wave form outputting application $\mathcal{A}$.

6. The method of claim 1, wherein the discrete wave is one of:

(a) Gaussian;

(b) Multivariate Gaussian;

(c) Bessel;

(d) Hat functions; and (e) Wavelets.

7. The method of claim 1, wherein the discrete wave is a function parameterized so that it forms an independent spanning set.

8. The method of claim 1, wherein said step of receiving includes outputting said amplitude data $b_x$ from one of: a mass spectrometer, and a light spectrometer.

9. The method of claim 1, wherein said step of second determining includes determining for each instance, I, of the discrete wave form, a center point of I said portion p.

10. The method of claim 1, wherein said functional $\sigma$ includes a summation of terms, $w_p * c_p$ for each said unknown reduced noise amplitude $c_p$ and $w_p >= 0$.

11. The method of claim 1, wherein said step of first obtaining includes obtaining a matrix A wherein an entry $a_{i,j}$ of A represents a cross-talk between discrete wave form instances $I_i$ and $I_j$.

12. The method of claim 11, wherein said step of first obtaining includes performing a linear programming technique for minimizing said functional $\sigma$ subject to the constraint: $A\bar{x} \leq \bar{b}$, wherein $\bar{b}$ is a vector whose entries include the $b_x$ for x in X.

13. The method of claim 1, wherein said second obtaining includes obtaining a matrix A wherein an entry $a_{i,j}$ of A represents a cross-talk between discrete wave form instances $I_i$ and $I_j$.

14. The method of claim 13, wherein said step of first obtaining includes performing a linear programming technique for minimizing said functional $\sigma$ subject to the constraint: $A\bar{x} \geq \bar{b}$, wherein $\bar{b}$ is a vector whose entries include the $b_x$ for x in X.

15. The method of claim 1, wherein said step of identifying includes:

determining, for at least one said $c_p$, a different value from both of $c_{p,MIN}$ and $c_{p,MAX}$ for the signal amplitude $b_{x_p}$ for the sample input $x_p$ corresponding to $c_p$; and performing said steps of first obtaining and second obtaining again for values $nc_{p,MIN}$ and $nc_{p,MAX}$ for said at least one $c_p$;

deriving a reduced noise amplitude value for said at least one $c_p$ using said $nc_{p,MIN}$ and $nc_{p,MAX}$.

16. The method of claim 15, wherein said step of deriving includes determining how much at least one of said $nc_{p,MIN}$ and $nc_{p,MAX}$ varies, respectively, from one of: (a) said different value, and (b) said $c_{p,MIN}$ and $c_{p,MAX}$ for said at least one $c_p$.

17. The method of claim 16, wherein said step of deriving includes determining said reduced noise amplitude value for said at least one $c_p$, wherein said reduced noise amplitude value is closer to the one of said $C_{p,MIN}$ and $c_{p,MAX}$ whose corresponding value $nc_{p,MIN}$ and $nc_{p,MAX}$ moved a least amount toward said different value.

18. A method for obtaining noise reduced data from measurements corresponding to each sample of a collection X having a plurality of data samples x, comprising:

receiving signal amplitude data, $b_x$ for each of x in X, wherein X includes a plurality of values within a predetermined range;

selecting a subcollection CNTR of X;

minimizing a functional σ that is dependent on a plurality of unknown reduced noise amplitudes $c_x$, where there is one of the $c_x$ for each x in CNTR, and wherein σ monotonically increases with increases in values for each $c_x$ when the values for $c_x$ are in the predetermined range;

wherein said step of minimizing is subject to the constraint: $f(x) \geq b_x$ for x in X, wherein f(x) is a function for approximating the pairs (x, $b_x$) for x in X wherein a solution obtained from said minimizing step includes an amplitude value $c_{x,MIN}$ for each said $c_x$;

maximizing said functional (subject to the constraint: $f(x) \leq b_x$ for x in X;

wherein a solution to said maximizing step includes an amplitude $c_{x,MAX}$ for each said $c_x$;

determining, for each said $c_x$, which of said $c_{x,MIN}$ and said $c_{x,MAX}$ includes a lesser amount of noise;

obtaining, for each said $c_x$, an amplitude value $nc_x$, wherein $c_{x,MAX} \mathrel{<=} nc_x \mathrel{<=} c_{x,MIN}$, and $nc_x$ is at least as close to said one of said $c_{x,MIN}$ and said $c_{x,MAX}$ determined in said determining step as to the other of said $c_{x,MIN}$ and said $c_{x,MAX}$;

outputting a result obtained using at least one $nc_x$, wherein said result is indicative of one of:
 (i) a purity, identity, amount, or structure of a substance, wherein the collection X is an outcome of an assay of the substance;
 (ii) data for one or more pixels, wherein the pixels are elements x of the collection X; and
 (iii) data for one or more audio segments, wherein the segments are elements x of the collection X.

19. The method of claim 18, wherein said result is indicative of a purity, identity, amount, or structure of a substance, wherein the collection X is an outcome of an assay of the substance.

20. The method of claim 18, wherein said result is indicative of data for one or more pixels, wherein the pixels are elements x of the collection X.

21. The method of claim 18, wherein said result is indicative data for one or more audio segments, wherein the segments are elements x of the collection X.

22. The method of claim 18, wherein said step of determining includes:

determining, for at least one said $c_x$, a different value from both of $c_{x,MIN}$ and $c_{x,MAX}$ for the signal amplitude $b_x$ corresponding to the data sample x corresponding to $c_x$; and performing said steps of minimizing and maximizing again for obtaining values $nc_{x,MIN}$ and $nc_{x,MAX}$ for said at least one $c_x$;

deriving a reduced noise amplitude value for said at least one $c_x$ using said $nc_{x,MIN}$ and $nc_{x,MAX}$.

23. The method of claim 22, wherein said step of deriving includes determining how much each of said $nc_{x,MIN}$ and $nc_{x,MAX}$ varies, respectively, from one of: (a) said different value, and (b) said $c_{x,MIN}$ and $c_{x,MAX}$ for said at least one $c_x$.

24. An apparatus for reducing noise in measurements corresponding to each value of a collection X having a plurality of data samples x, comprising:

a device for generating measurements $b_x$ for each x in X, wherein said device determines each said $b_x$ from one of: an amplitude, and an intensity of a signal received from a source external to said device, wherein said collection X includes values x indicative of one of:
 (A1) a purity, identity, amount, or structure of a substance, wherein the collection X is an outcome of an assay of the substance;
 (A2) data for one or more pixels, wherein the pixels are elements x of the collection X; and
 (A3) data for one or more audio segments, wherein the segments are elements x of the collection X, a noise reduction/resolution enhancement engine for performing the following steps (a) through (e):
 (a) selecting a subcollection CNTR of X;
 (b) minimizing a functional σ that is dependent on a plurality of unknown reduced noise amplitudes $c_x$, where there is one of the $c_x$ for each x in CNTR, and wherein σ monotonically increases with increases in values for each $c_x$ when the values for $c_x$ are in the predetermined range;
  wherein said step of minimizing is subject to the constraint: $f(x) \geq b_x$ for x in X, wherein f(x) is a function for approximating the pairs (x, $b_x$) for x in X
  wherein a solution obtained from said minimizing step includes an amplitude value $c_{x,MIN}$ for each said $c_x$;
 (c) maximizing said functional σ subject to the constraint: $f(x) \leq b_x$ for x in X;
  wherein a solution to said maximizing step includes an amplitude $c_{x,MAX}$ for each said $c_x$;
 (d) determining, for each said $c_x$, which of said $c_{x,MIN}$ and said $c_{x,MAX}$ includes a lesser amount of noise;
 (e) obtaining, for each said $c_x$, an amplitude value $nc_x$, wherein $c_{x,MAX} \mathrel{<=} nc_x \mathrel{<=} c_{x,MIN}$, and $nc_x$ is at least as close to said one of said $c_{x,MIN}$ and said $c_{x,MAX}$ determined in said determining step as to the other of said $c_{x,MIN}$ and said $c_{x,MAX}$;
 (f) outputting a result obtained using at least one $nc_x$, wherein said result is indicative of one of:
  (i) a purity, identity, amount, or structure of the substance, wherein the collection X is the outcome of the assay of the substance;
  (ii) data for one or more pixels, wherein the pixels are elements x of the collection X; and
  (iii) data for one or more audio segments, wherein the segments are elements x of the collection X.

\* \* \* \* \*